US011415183B2

(12) United States Patent
 Cioc

(10) Patent No.: US 11,415,183 B2
(45) Date of Patent: Aug. 16, 2022

(54) ROTATING ELECTRICALLY-CONTROLLED ONE-WAY CLUTCH (EOWC) WITH BALL CAM ACTUATION MECHANISM

(71) Applicant: MAGNA POWERTRAIN, INC., Concord (CA)

(72) Inventor: Adrian Cioc, Concord (CA)

(73) Assignee: MAGNA POWERTRAIN INC, Concord (CA)

( * ) Notice: Subject to any disclaimer, the term of this patent is extended or adjusted under 35 U.S.C. 154(b) by 0 days.

(21) Appl. No.: 17/416,543

(22) PCT Filed: Jan. 24, 2020

(86) PCT No.: PCT/CA2020/050085
 § 371 (c)(1),
 (2) Date: Jun. 21, 2021

(87) PCT Pub. No.: WO2020/150833
 PCT Pub. Date: Jul. 30, 2020

(65) Prior Publication Data
 US 2022/0082139 A1   Mar. 17, 2022

Related U.S. Application Data

(60) Provisional application No. 62/796,717, filed on Jan. 25, 2019.

(51) Int. Cl.
 *F16D 27/102*   (2006.01)
 *B60K 17/02*   (2006.01)
 (Continued)

(52) U.S. Cl.
 CPC ............ *F16D 27/102* (2013.01); *B60K 17/02* (2013.01); *B60K 23/08* (2013.01); *F16D 27/118* (2013.01);
 (Continued)

(58) Field of Classification Search
 CPC .......... F16D 41/08; F16D 41/12; F16D 41/16; F16D 27/102; F16D 27/118; B60K 17/02; B60K 23/08; B60K 2001/001
 See application file for complete search history.

(56) References Cited

U.S. PATENT DOCUMENTS 9,732,809 B2   8/2017 Niemiec et al.
10,066,679 B2   9/2018 Cioc
(Continued)

*Primary Examiner* — Ernesto A Suarez
*Assistant Examiner* — Lori Wu
(74) *Attorney, Agent, or Firm* — Dickinson Wright PLLC

(57) ABSTRACT

A controllable one-way clutch having a clutch module and a power-operated actuator module. The clutch module includes a first clutch component rotatably driven by an input member, a second clutch component rotatably driving an output member, struts disposed on the first clutch component for movement between a deployed position engaging ratchet teeth on the second clutch component and a non-deployed position disengaged from the ratchet teeth, and strut springs for biasing the struts toward their deployed position. The power-operated actuator module includes a coil unit, an armature moveable between an engaged position whereat the armature holds the struts in their non-deployed positions when the coil unit is powered-off and a released position where the armature releases the struts when the coil unit is powered-on, and a ballramp mechanism configured to move the armature along a helical path between its engaged and released positions.

18 Claims, 26 Drawing Sheets

(51) Int. Cl.
  *B60K 23/08*  (2006.01)
  *F16D 27/118* (2006.01)
  *F16D 41/16*  (2006.01)
  *B60K 1/00*   (2006.01)

(52) U.S. Cl.
  CPC ........ *F16D 41/16* (2013.01); *B60K 2001/001* (2013.01)

(56) References Cited

U.S. PATENT DOCUMENTS

| | | | |
|---|---|---|---|
| 2009/0078073 A1* | 3/2009 | Kubo | F16H 63/30 74/335 |
| 2012/0149520 A1* | 6/2012 | Schneidewind | B60L 15/20 475/296 |
| 2016/0356323 A1 | 12/2016 | Endo et al. | |
| 2018/0149211 A1 | 5/2018 | Kurosaki et al. | |
| 2018/0266502 A1 | 9/2018 | Shioiri et al. | |
| 2021/0262533 A1* | 8/2021 | Liebert | F16D 27/118 |

* cited by examiner

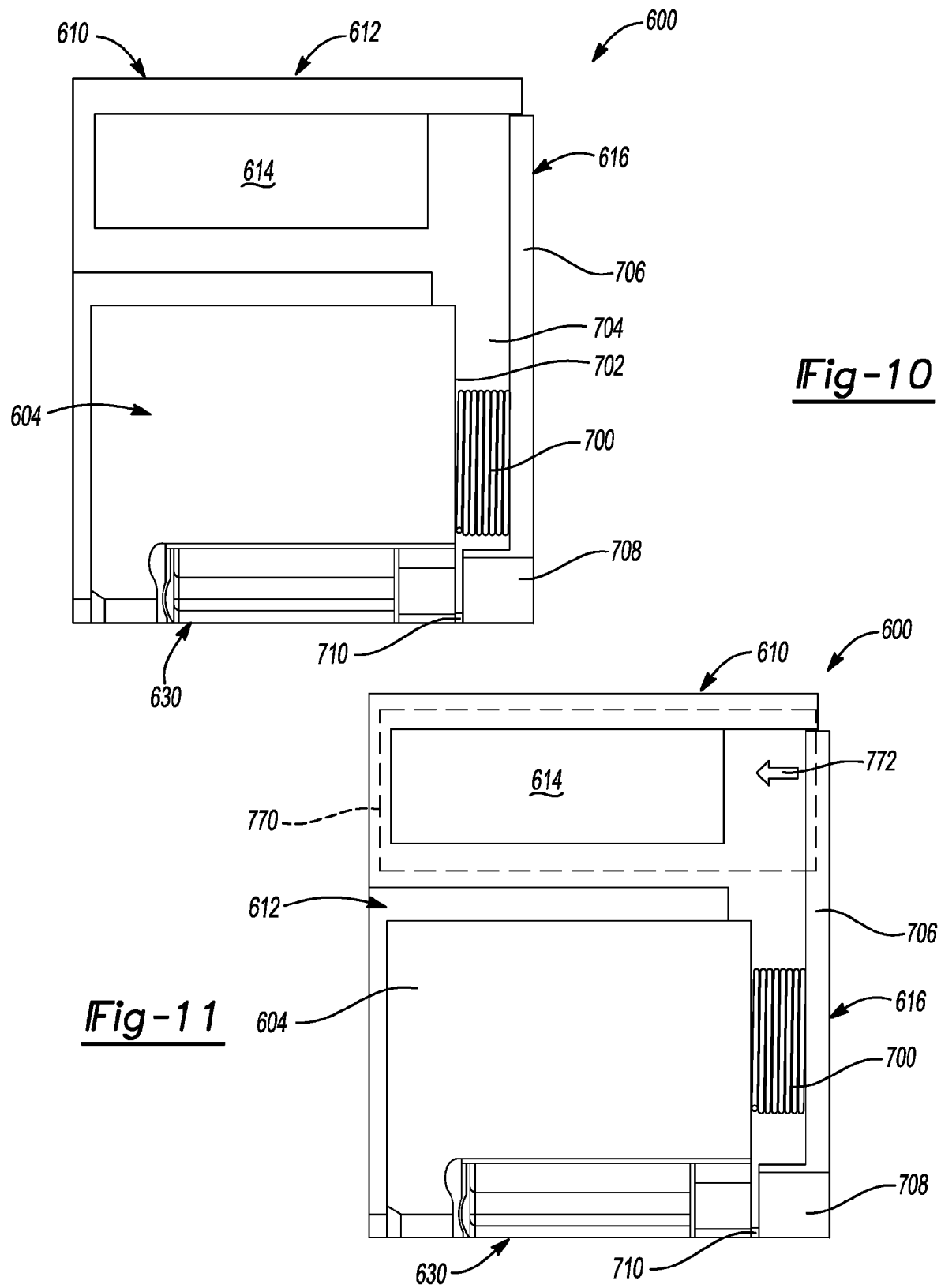

ROTATING ELECTRICALLY-CONTROLLED ONE-WAY CLUTCH (EOWC) WITH BALL CAM ACTUATION MECHANISM

CROSS-REFERENCE TO RELATED APPLICATIONS

This patent application claims the benefit and priority of U.S. Provisional Patent Application Ser. No. 62/796,717, filed Jan. 25, 2019, the entire disclosure of which is incorporated herein by reference.

FIELD OF THE INVENTION

The present disclosure is generally related to overrunning coupling devices and, more specifically to electrically-controlled one-way clutch (eOWC) devices having an electromagnetic actuator. The present disclosure is further related to use of such eOWC devices in motor vehicle driveline applications to provide a disconnect feature when equipped within electric drive axle and/or electric transaxles as well as when equipped within drive axle assemblies.

BACKGROUND OF THE INVENTION

This section provides background information related to the present disclosure which is not necessarily prior art.

Clutches and/or brakes are used in a variety of motor vehicle applications to establish a torque-transmitting drive connection between an input component and an output component for supplying motive power (i.e., drive torque) from a powertrain to a driveline. One type of brake or clutch widely used is an overrunning coupling device, commonly referred to as a one-way clutch (OWC), which overruns when one of its races (in radial coupling configuration) or one of its drive plates (in axial coupling configurations) rotates in a first (i.e., freewheel) direction relative to the other race or drive plate, and engages or locks in a second (i.e., lockup) direction. Such conventional one-way clutches provide no independent control over their modes of operation, that is to say whether they lockup or freewheel in both directions and are commonly referred to as passive one-way clutches. Thus, basic one-way clutches provide a "Locked" mode in one rotary direction and a "Freewheel" mode in the opposite direction based on the direction that the drive torque is being applied to the input race or drive plate.

There are however, requirements where a "controllable" overrunning coupling device, also commonly referred to as a selectable one-way clutch, can be selectively controlled to provide additional functional modes of operation. Specifically, a selectable one-way clutch may further be capable of providing a Freewheel mode in both rotary directions until a command signal (i.e., from a vehicle controller) causes a power-operated actuator to shift the coupling device into its Locked mode. Thus, a selectable one-way clutch may be capable of providing a drive connection between an input member and an output member in one or both rotational directions and it may also be operable to freewheel in one or both directions. It is also known to integrate a passive one-way clutch and a selectable one-way clutch into a combined coupling device, commonly referred to as a bi-directional clutch.

In addition to traditional motor vehicles, significant development activity is currently directed to electric transaxles and electric drive axles which are driven by an electric motor for providing the motor vehicle with an electric drive mode. In such devices, a mechanical coupling device is employed to selectively disconnect the electric motor from a geartrain (i.e., multi-speed transmission, final drive unit, planetary gearset, etc.) to prevent unnecessary drag when the electric drive mode is not selected. Conversely, the mechanical coupling device also functions to drivingly connect the electric motor to the geartrain when the electric drive mode is selected. Currently, these mechanical coupling devices, commonly referred to as "disconnect" clutches, are of the positive-engagement dog-clutch configuration and are only capable of providing ON/OFF functionality. Such dog-type disconnect clutches typically have high backlash angles, require very high release forces to disengage, and do not allow a ratcheting (i.e. one-way freewheeling) behavior to accommodate a unidirectional overrun condition.

In view of the above, a need exists to continue development of new and improved overrunning coupling devices that advance the art and provide enhanced functionality. Specifically, a need exists to develop alternative disconnect clutches providing reduced backlash tooth engagement and which are capable of additional modes of operation, such as a freewheeling mode.

SUMMARY

The following listing of various aspects, features and embodiments of the present disclosure is not intended to be an exhaustive and comprehensive summation of all the inventive concepts disclosed herein and protected by the claims of this application It is an aspect of the present disclosure to provide a controllable one-way clutch configured to provide a disconnect function when installed in a motor vehicle driveline.

It is a related aspect of the present disclosure to configure the controllable one-way clutch as an axle disconnect clutch to provide the disconnect function in association with a drive axle assembly of AWD/4WD vehicles.

It is an alternative aspect of the present disclosure to configure the controllable one-way clutch as a motor disconnect clutch in an electric transaxle or an electric drive axle to provide the disconnect function for selectively disconnecting an electric motor with respect to a geartrain.

It is yet another related aspect of the present disclosure to configure the controllable one-way clutch as an electrically-controlled one-way clutch (eOWC) having a clutch module and a power-operated actuator. The clutch module may include rotary first and second clutch components, a plurality of struts supported on the first clutch component for movement between a first or "deployed" position engaged with ratchet teeth formed on the second clutch component and a second or "non-deployed" position displaced from engagement with the ratchet teeth, and strut springs normally biasing the struts toward their deployed positions. The power-operated actuator being operable in a first or "power-off" condition to mechanically engage the struts and hold the struts in their non-deployed positions and in a second or "power-on" condition to disengage the struts and allow the strut springs to locate the struts in their deployed positions.

It is a still further aspect of the present disclosure to configure the power-operated actuator as an electromagnetic actuator assembly having a stationary coil unit, an armature moveable relative to the coil unit and the struts between a first or "engaged" position whereat the armature engages and holds the struts in their non-deployed positions and a second or "released" position whereat the armature is displaced from engagement with the struts, an armature biasing arrangement configured to normally bias the armature toward its engaged position, and a ballramp mechanism disposed between the clutch module and the armature. Energization of the coil unit establishes the power-on condition and causes the armature to move from its engaged position to its released position in opposition to the biasing force exerted on the armature by the armature biasing arrangement. Subsequent de-energization of the coil unit establishes the power-off condition and permits the armature biasing arrangement to drive the armature back to its engaged position. A "Freewheel" mode is established in the power-off condition to provide the disconnect function. A "Latched" mode is established in the power-on condition to permit torque transfer in a first relative rotary direction and ratcheting in a second relative rotary direction.

It is yet another related aspect of the present disclosure to configure the ballramp mechanism to cause the armature to travel along a helical path between its engaged and released position.

These and other features and advantages of the present invention will become more readily appreciated when considered in connection with the following detailed description and appending drawings.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein:

FIG. 10 is a sectional view of the bi-directional clutch assembly of FIG. 7 which better illustrates many of the components associated with the active strut assembly and an electromagnetic actuator assembly;

FIG. 11 is similar to FIG. 10 and now illustrates a magnetic flux path generated in response to energization of a coil unit and corresponding axial movement of an armature ring associated with the electromagnetic actuator assembly resulting from the magnetic flux path;

DESCRIPTION OF THE ENABLING EMBODIMENTS

Figure 1:
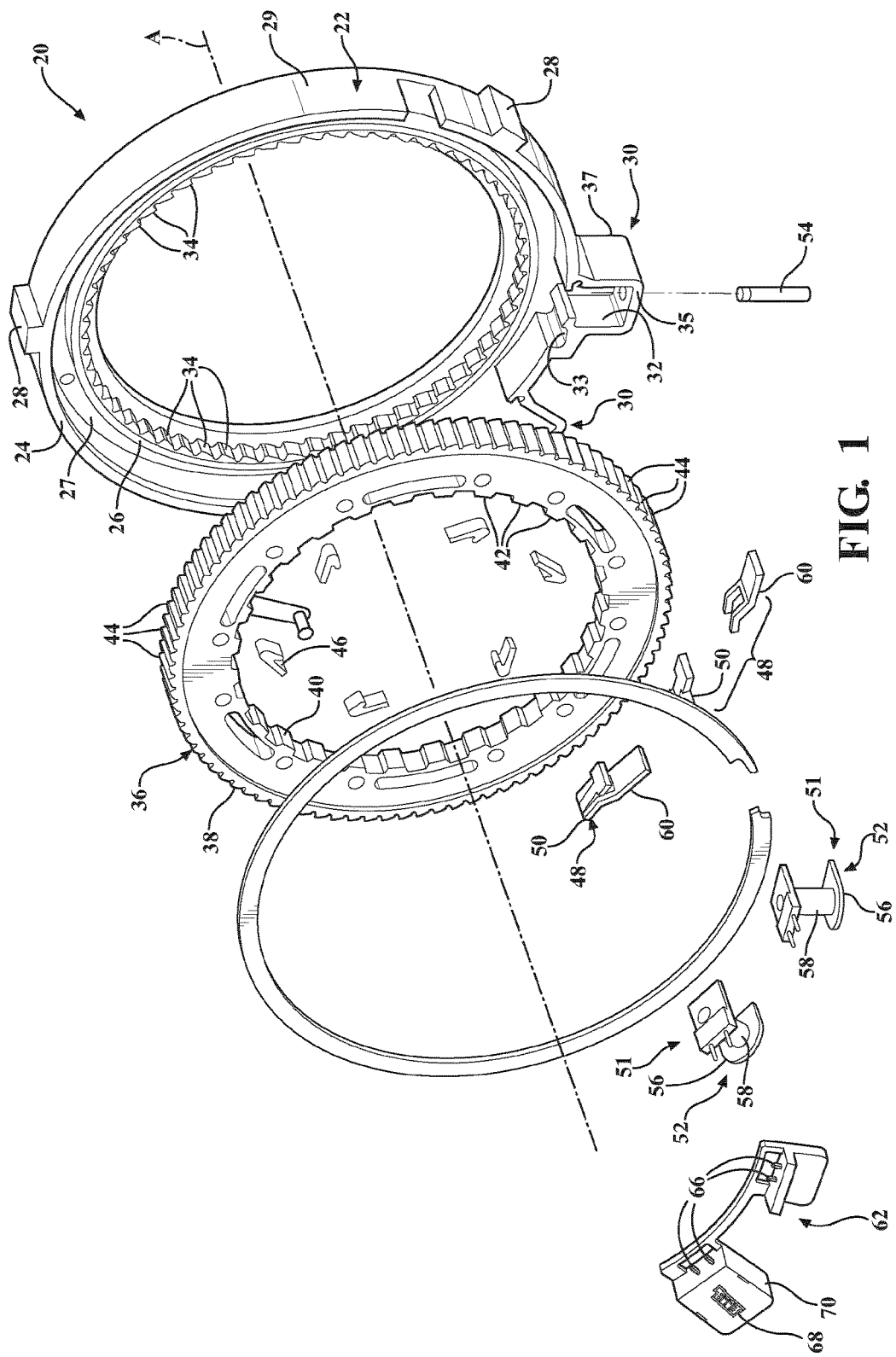
FIG. 1 is an exploded isometric view of a bi-directional clutch assembly configured to include a passive one-way clutch having passive struts, and a controllable one-way clutch having a pair of electromagnetic actuators and a pair of active strut assemblies.

Example embodiments will now be described more fully with reference to the accompanying drawings. In general, each embodiment is directed to an overrunning coupling device (i.e. brake and/or clutch) having at least a controllable one-way locking device including a moveable locking component (i.e. sprag, strut, etc.) that is controlled, at least in part, via an electromagnetic actuator. Thus, the overrunning coupling device transmits torque mechanically but is shifted between operating modes via an electrical actuation system. It is to be recognized the example embodiments only are provided so that this disclosure will be thorough, and will fully convey the scope, which is ultimately defined by the claims, to those who are skilled in the art. Numerous specific details are set forth, such as examples of specific components, devices, and methods, to provide a thorough understanding of embodiments of the present disclosure. It will be apparent to those skilled in the art that certain specific details need not be employed, that example embodiments may be embodied in many different forms, and that neither should be construed to limit the scope of the disclosure or the claims. In some example embodiments, well-understood processes, well-understood device structures, and well-understood technologies are not described in detail.

Referring to FIGS. 1, 3 and 3A-3B, wherein like numerals indicate corresponding parts throughout the several views, unless otherwise stated, a bi-directional clutch assembly 20 is generally shown. As will be detailed in further detail below, bi-directional clutch assembly 20 generally includes a stationary outer race, a rotatable inner race, a passive one-way clutch having a plurality of passive struts, and a controllable one-way clutch having at least one active strut assembly and an electromagnetic actuator associated with each active strut assembly. The clutch assembly 20 includes an outer housing presenting an outer race 22 that extends annularly about an axis A. It should be recognized the outer housing/outer race 22 can be constructed as a single piece of material or as separate pieces of material and subsequently fixed to one another, as will be appreciated by one skilled in the art. The outer race 22 includes an outer ring segment 24 and an inner ring segment 26 that are spaced radially from one another and interconnected via a radial web segment 27. The outer ring segment 24 presents a plurality of outer lugs 28 that extend radially outwardly from an outer surface 29 of the outer ring segment 24 for mating with a first component. The first component can be a stationary component (such as a housing of a transmission) or a rotary component (such as a shaft). The outer ring segment 24 further presents at least one, and shown as a pair of coil assembly support protrusions, referred to hereafter simply as protrusions 30, that extend radially outwardly from the outer surface 29 of the outer ring segment 24. Each of the protrusions 30 forms a radially extending actuator pocket 32 and a strut pocket 33. The respective pockets 32, 33 are shown as being open along one side surface 35, and closed along an opposite side surface 37 by a wall of the protrusion 30. It should be appreciated that more or fewer protrusions 30 could be provided by the outer ring segment 24. The inner ring segment 26 presents a plurality of inner ramp surfaces, hereinafter referred to as inner ratchet teeth 34, that extend radially inwardly and are evenly distributed about the axis A.

The clutch assembly 20 further includes an annular inner race 36 that also extends annularly about the axis A. The inner race 36 has an outer rim 38 and an inner rim 40 that are spaced radially from one another by a radial web segment 41. Upon assembly, the outer rim 38 is disposed radially between the outer and inner ring segments 24, 26 of the outer race 22, and the inner rim 40 is disposed radially inwardly from the inner ring segment 26 of the outer race 22. The inner rim 40 of the inner race 36 presents a plurality of inner lugs 42 that extend radially inwardly for mating with a second component (typically a rotary component). Commonly, lugs 42 interconnect a shaft or clutch plates for conjoint rotation with inner race 36. Further, the outer rim 38 of the inner race 36 presents a plurality of outer ramp surfaces, hereinafter referred to as outer ratchet teeth 44, that extend radially outwardly and are evenly distributed about the axis A.

The passive one-way clutch includes a plurality of locking elements, also referred to as passive struts 46, which are pivotally supported in strut apertures formed in the inner race 36 for pivotal movement between a locking position and an unlocking position. In the locking position, the passive struts 46 engage the inner ratchet teeth 34 of the outer race 22 for connecting the outer and inner races 22, 36 to one another during counter-clockwise rotation of the inner race 36 relative to the outer race 22. Therefore, engagement by one or more of the passive struts 46 prevents relative displacement of the outer and inner races 22, 36 in the counter-clockwise direction. However, the passive struts 46 still allow relative displacement between the outer and inner races 22, 36, i.e., overrun, in the clockwise direction when located in the locked position since they "ratchet" over the ramped profile of the inner ratchet teeth 34. In the unlocked position, the passive struts 46 are radially spaced from the inner ratchet teeth 34 of the outer race 22, therefore also allowing counter-clockwise rotation of the inner race 36 relative to the outer race 22.

In association with the controllable one-way clutch, an active strut assembly 48, a portion of which is received by each of the strut pockets 33 in the outer ring segment 24. Each of the active strut assemblies 48 includes an active strut 50 that is selectively pivotal between a deployed and an non-deployed position. In the deployed position (FIG. 3A), a portion of the active strut 50 lockingly engages the outer ratchet teeth 44 of the inner race 36, thereby locking the outer and inner races 22, 36 to one another during clockwise movement of the inner race 36 relative to the outer race 22. However, the active strut 50 still allows relative displacement between the outer and inner races 22, 36, i.e., overrun, in the counter-clockwise direction. In the non-deployed position (FIG. 3B), the active strut 50 is radially spaced from the outer ratchet teeth 44, allowing the inner and outer races 22, 36 to rotate relative to one another. Furthermore, each of the active strut assemblies 48 includes an armature 60 that is disposed adjacent to, and in operable communication with, the active strut 50 for providing the selective pivotal movement of the active strut 50.

The controllable one-way clutch also includes an electromagnetic actuator 51, which is associated in operable communication with each active strut 50. Each electromagnetic actuator 51 includes a coil assembly 52. The coil assembly 52 is mounted in the actuator pocket 32 and is radially spaced from the active strut 50 and armature 60. The coil assembly 52 includes an elongate pole piece or core 54 of a paramagnetic or ferromagnetic, magnetically permeable material, shown by way of example and without limitation as being generally cylindrical, a bobbin 56 disposed about the core 54, and at least one coil 58 spirally wrapped about the bobbin 56. Furthermore, the armature 60 is a magnetic component disposed between the active strut 50 and the core 54/coil 58. The armature 60 pivots toward the core 54, due to magnetic attraction caused via energization of the coil assembly 52, and thus providing the pivotal movement of the active strut 50 in response to energization of the coil 58 via electric current.

More specifically, when electric voltage and/or current are applied to the coil 58, the coil 58 becomes an electromagnet producing an electric field (or magnetic flux). The flux flows outwards in all directions and transfers through the small preset air gap G (FIG. 3B) between the armature 60 and core 54, which extends through a central through passage of the bobbin 56 of the coil assembly 52. The core 54 becomes selectively magnetized by the energized coil 58, thereby attracting and pivoting the magnetically attracted metallic armature 60 towards the core 54. The resulting pivoting motion of the armature 60 forces the active strut 50 to mechanically deploy radially inwardly due to the linkage between the active strut 50 and the armature 60. On deployment, the active strut 50 moves from its non-deployed position (FIG. 3B) to its deployed position (FIG. 3A) where it locates itself against one of the outer ratchet teeth 44 of the inner race 36, effectively locking the inner race 36 from rotating clockwise relative to the outer race 22. Disengagement occurs as voltage and/or current is removed from the coil assembly 52, wherein the core 54 is selectively and suddenly demagnetized, thus releasing the armature 60 from being magnetically attracted to the core 54 of the coil assembly 52. A strut biasing spring 61 is positioned within the strut pocket 33 between an end portion of the active strut 50 and the outer race 22, causing the active strut 50 to pivot back to its non-deployed position upon de-energization of the coil assembly 52 and demagnification of the core 54.

It should be appreciated that the arrangement of the armature 60, active strut 50, and coil assembly 52 can act to apply a locking force in a radial direction (as shown in FIG. 1) or an axial direction, depending on the layout and/or requirements of the clutch assembly 20. Radial stacked clutch assembly 20 designs offer packaging advantages over their axial counterparts in situations where axial space is tight, e.g., in automatic transmissions. Further, radially applied clutches transmit driving torque directly outwards to be grounded against the transmission housing without the fear of forces being directed axially which could cause problems for the sizing of other system components to compensate for axial force.

Figure 2:
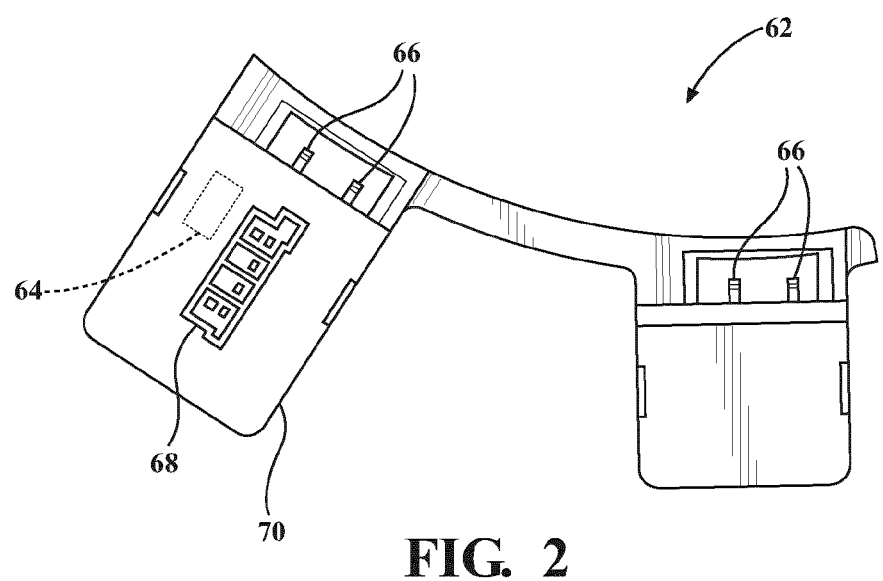
FIG. 2 is a front view of a lead frame and an integrated safety switch for controlling the electromagnetic actuators of FIG. 1.

As shown in FIGS. 1 and 2, a lead frame 62 is attached to each of the electromagnetic actuators 51 for electrically connecting the coils 58 to one another for simultaneously energizing the coils 58. It should be appreciated that the lead frame 62 could connect any number of coils 58. A printed circuit board (PCB) 64 is attached to the lead frame 62 for selectively controlling the energization of the coils 58. The PCB 64 is disposed radially and axially adjacent to one of the coils 58. The lead frame 62 further includes at least one power output contact 66 that is disposed radially and axially adjacent to each of the coils 58 for electrically connecting to the coils 58 to provide power to the coils 58. Any number of power contacts 66 could be utilized to power any number of coils 58. Any suitable connection can be utilized to connect the power output contact 66 and the coils 58. Furthermore, at least one wire (not shown) extends between the circuit board 64 and each of the power output contacts 66 for electrically connecting the circuit board 64 and the power output contacts 66. The lead frame 62 also includes connection interface 68 for establishing an electrical connection between the printed circuit board 64 and an external control module, such as an electronic control unit (ECV) for transmitting data to the PCB 64 and to power the PCB 64. Additionally, the lead frame 62 includes a plastic encapsulation or casing 70 that is disposed about the PCB 64 and the electronics for protecting the PCB 64 and the electronics for allowing the lead frame 62 to be submerged in automatic transmission fluid (ATF) and operate in −40 C to +140 C temperatures. It should be appreciated that the aforementioned configuration of the lead frame 62 and associated components provide a low-cost, modular solution that provides for a more simplified manufacturing process and assembly.

Figure 3:
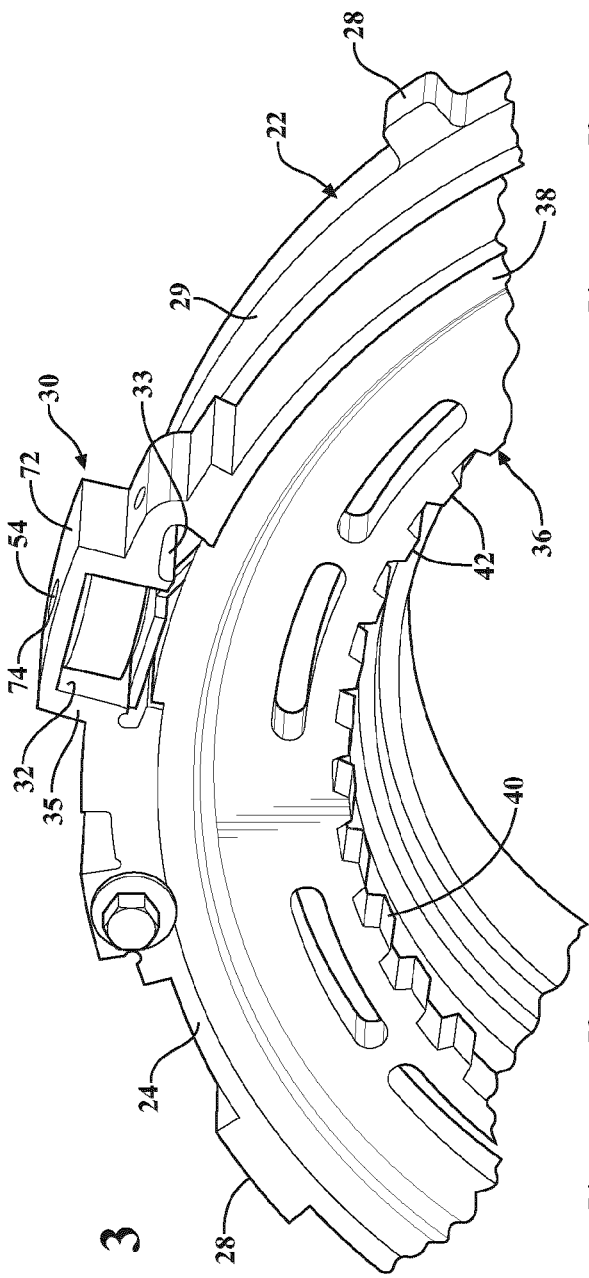
FIG. 3 is an assembled partial isometric view of the clutch assembly of FIG. 1 showing an arrangement for installing the electromagnetic actuators in an axially directed configuration.
Figure 3A:
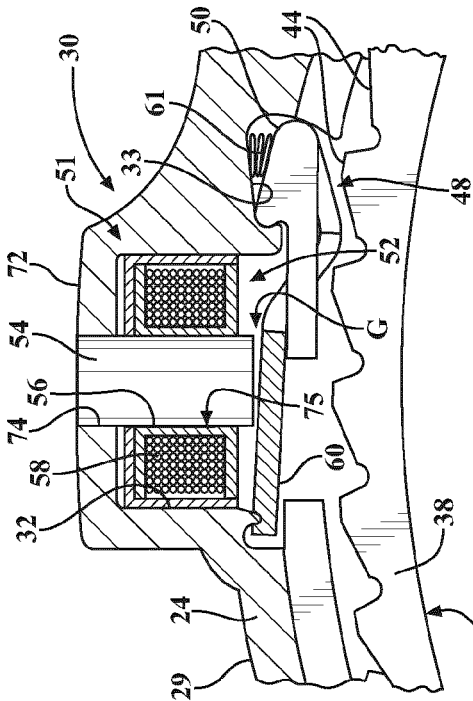
FIGS. 3A and 3B are cross-sectional side views of the electromagnetic actuator of FIG. 3 with an active strut of the active strut assembly shown in deployed and non-deployed positions, respectively, in response to respective energized and de-energized states of the electromagnetic actuator.
Figure 3B:
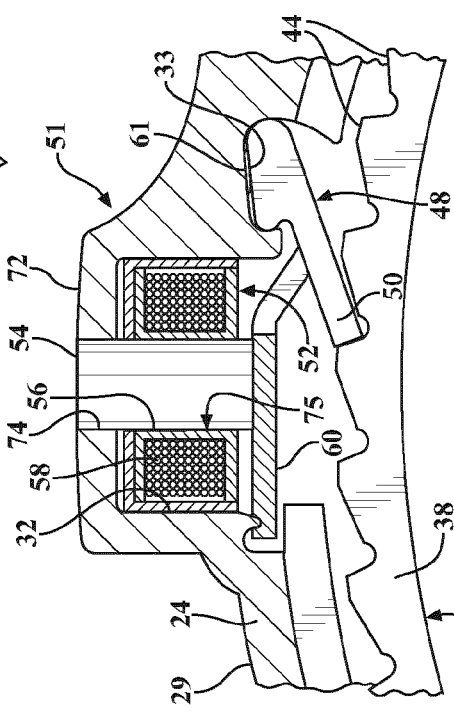
Figure 4A:
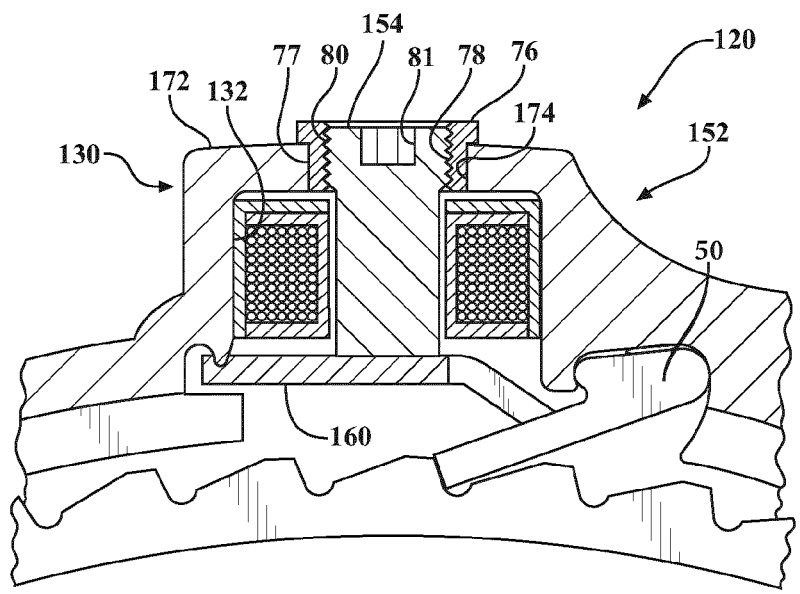
FIGS. 4A and 4B are similar views to FIGS. 3A and 3B but show an electromagnetic actuator constructed in accordance with another aspect of the present disclosure.
Figure 4B:
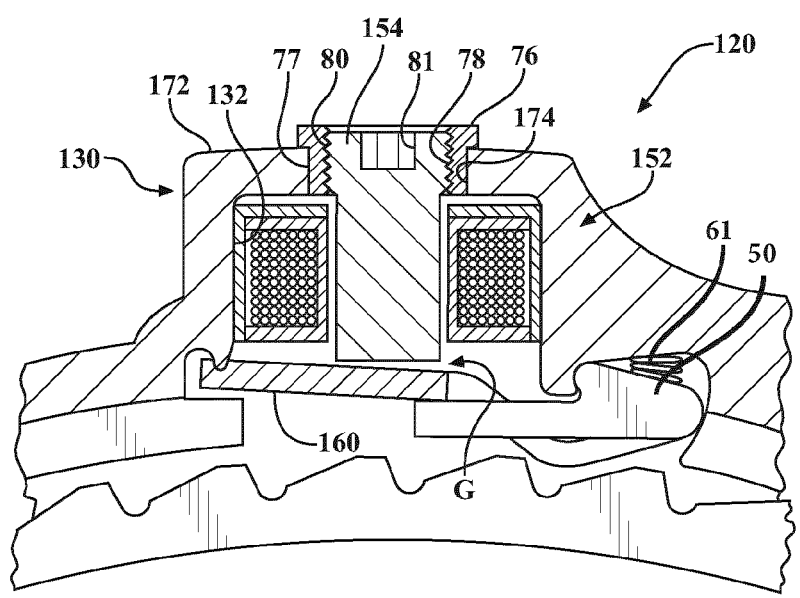

Referring to FIGS. 3, 3A and 3B, an example embodiment of the protrusions 30, shows the open side surface 35 defines the actuator pocket 32 which is configured for axially receiving the coil assembly 52. Furthermore, a radially outwardly facing outer wall 72 of the protrusion 30 provides a through passage, also referred to simply as orifice 74, that extends radially inwardly into the actuator pocket 32. In this embodiment, coil 58 and bobbin 56 are axially disposed and press fit into the actuator pocket 32 through the open side surface 35. Once in position in the actuator pocket 32, which extends radially inwardly from the outer wall 72, the core 54 is pressed radially inwardly through the orifice 74 and through a central through passage of the bobbin 56 until it reaches a predetermined, preset location which sets the magnetic gap G between an armature 60 and the free end of the core 54. The core 54 attains a press fit against an inner surface 75 that defines and bounds the through passage of the bobbin 56, thereby being fixed against movement therein. The core 54 can further be press fit in the through passage of the bobbin 56, or configured in a clearance fit therein. FIG. 3A shows an active strut 50 in the deployed position as a result of energization of the coil assembly 52 and FIG. 3B shows the active strut 50 in the non-deployed position as a result of de-energizing the coil assembly 52.

Figure 5:
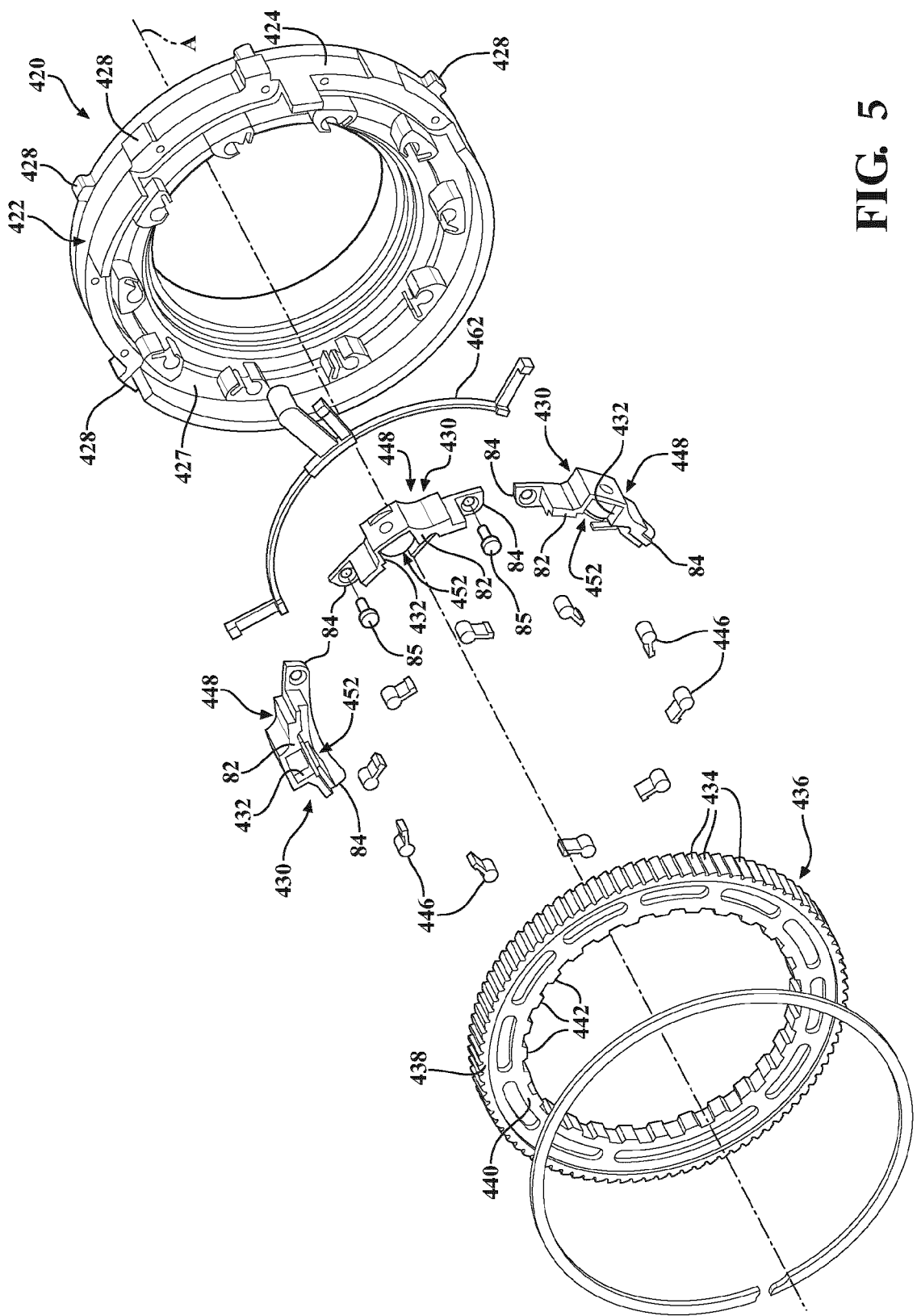
FIG. 5 is an exploded isometric view of a bi-directional clutch assembly configured to include a modular active strut arrangement for a controllable one-way clutch in accordance with another aspect of the present disclosure.
Figure 6:
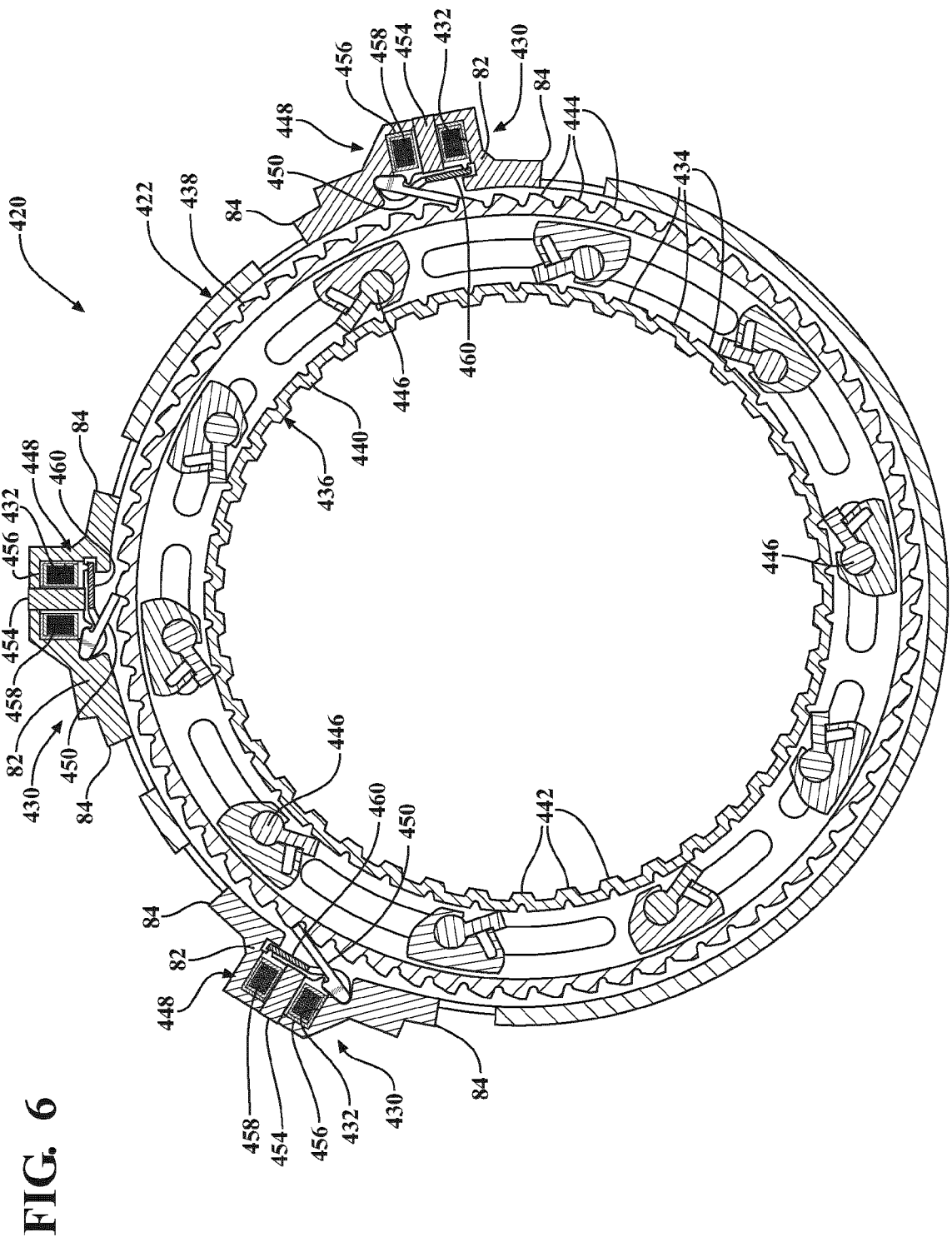
FIG. 6 is a cross-sectional side view of the bi-directional clutch assembly shown in FIG. 5.

Referring to FIGS. 5 and 6, wherein like numerals indicate corresponding parts throughout the several views, offset by a factor of 400, another embodiment of a clutch assembly 420 is generally shown. The clutch assembly 420 includes an outer race 422 that extends annularly about an axis A. The outer race 422 includes an outer ring 424 that presents a plurality of outer lugs 428 that extend radially outwardly for mating with a first component. The first component can be a stationary component (such as a housing of a transmission) or a rotary component (such as a shaft). The outer race 422 further has an axially facing web or face 427 that has an annular shape that extends radially inwardly from the outer ring 424. A plurality of passive struts 446 are pivotally connected to the axial face 427. A biasing spring (not shown) engages each of the passive struts 446 for biasing the passive struts 446 in a locked position toward an inner race 436.

The inner race 436 extends annularly about the axis A. The inner race 436 has an outside rim or band 438 and an inside rim or band 440 that are spaced radially from one another on opposing sides of the passive struts 446. The inside band 440 of the inner race 436 presents a plurality of inner lugs 442 that extend radially inwardly therefrom for mating with a second component (typically a rotary component). The inside band 440 of the inner race 436 further presents a plurality of passive teeth 434 that extend radially outwardly therefrom for being engaged by the passive struts 446 for locking the inner and outer races 436, 422 to one another in response to counter-clockwise rotation of the inner race 436 relative to the outer race 422. The outside band 438 of the inner race 436 presents a plurality of active teeth 444 that extend radially outwardly therefrom and are evenly distributed about the axis A.

A plurality of active strut assemblies 448 are axially connected to the outer race 422. Each of the active strut assemblies 448 includes a generally arc shaped protrusion 430, wherein the protrusion 430 is constructed as separate piece of material from the outer race 422. Each protrusion 430 includes a base 82 and a pair of circumferentially extending flanges 84 that extend from the base 82 on opposing sides of the base 82. A fastener 85, e.g., a bolt, extends axially through a through opening in each of the flanges 84 and is fastened to the outer race 422 for securing the active strut assemblies 448 to the outer race 422. The active strut assemblies 448 are arranged in circumferential alignment with one another about the axis A, as desired.

An actuator pocket 432 extends axially into the base 82 of each of the active strut assemblies 448. A coil assembly 452 is disposed in each of the actuator pockets 432. The coil assembly 452 includes a core 454 of a magnetically permeable material, a bobbin 456 configured for receipt about the core 454, and a coil 458 wrapped about the bobbin 456. It should be appreciated that the bobbins 456 and coils 458 of the coil assemblies 452 can advantageously be easily fitted into their respective pockets 432 for easy installation.

Each of the active strut assemblies 448 includes an active strut 450 that is selectively pivotal between a deployed and a non-deployed position, as discussed above. In the deployed position, the active struts 450 engage the active teeth 444 of the inner race 436, therefore locking the outer and inner races 422, 436 to one another during clockwise movement of the inner race 436 relative to the outer race 422. However, the active struts 450 allow relative displacement, i.e., overrun, in the counter-clockwise direction. In the non-deployed position, the active struts 450 are radially spaced from the active teeth 444, allowing the outer and inner races 422, 436 to rotate relative to one another.

The plurality of passive struts 446 are pivotal between a locking position and an unlocking position. In the locking position, the passive struts 446 engage the passive teeth 434 of the outer race 422 for connecting the outer and inner races 422, 436 to one another during counter-clockwise rotation of the inner race 436 relative to the outer race 422. Therefore, engagement by the passive struts 446 prevents relative displacement of the outer and inner races 422, 436 in the counter-clockwise direction, however, the passive struts 446 allow relative displacement, i.e., overrun, in the clockwise direction. In the unlocking position, the passive struts 446 are radially space from the passive teeth 434 of the outer race 422, thereby allowing counter-clockwise rotation of the inner race 436 relative to the outer race 422.

Each of the active strut assemblies 448 further includes an armature 460 disposed between the active strut 450 and the core 454 for providing the pivotal movement of the active strut 450 in response to energization of the coil 458. A lead frame 462, such as discussed above with regard to FIGS. 1 and 2, electrically connects the coils 458 to one another for energizing the coils 458 to actuate and pivot the active struts 450 to their engaged, locked positions.

Accordingly, it should be appreciated that the modular configuration of the active strut assemblies/coil assemblies 448, 452 allows the active strut assemblies/coil assemblies 448, 452 to be manufactured separately from the rest of the clutch assembly 420. Further, it should be appreciated that any number of the active strut assemblies/coil assemblies 448, 452 could be installed on any given clutch assembly 420 as needed to provide a needed amount of torque. Additionally, it should be appreciated that the modular active strut assemblies as described herein could be utilized on various other clutch assembly configurations.

Each of the bi-directional clutch assemblies disclosed in reference to FIGS. 1-6 are generally configured to include a stationary outer race and a rotary inner race with the passive and active struts arranged to establish a locked (i.e. "braked") connection therebetween. Obviously, these bi-directional clutch assemblies could also be configured for use with rotary inner and outer races to establish "rotary" connections therebetween as well. In this regard, the present disclosure also contemplates alternative configurations of a bi-directional clutch assembly comprising: a rotary outer race; a rotary inner race; a passive one-way clutch operable to normally establish a reasonable torque-transferring connection between the inner and outer races; and a controllable one-way clutch selectively actuated by an electromagnetic actuator to establish other torque-transferring connections between the inner and outer races. Particular applications of this type of bi-directional clutch assembly may include, without limitations, axle disconnect clutches in 4WD/AWD drivelines as well as motor disconnect clutches in electric transaxles and electric drive axles. Accordingly, the following embodiment illustrated in FIGS. 7-14 is directed to this type of electric disconnect (E-Disconnect) clutch assembly and provide enhancements with respect to traditional dog-type positive engagement clutches now used in conventional arrangements.

By way of background, there is a recognized need in hybrid vehicle applications to employ a mechanical coupling device to selectively connect and disconnect an electric motor with respect to a geartrain within an E-drive assembly (i.e. electric transaxle, electric drive axle, etc.). The mechanical coupling devices must be operable to selectively couple the rotary output of the electric motor to the geartrain (or other portions of the driveline) when needed to establish an electric drive mode, and to uncouple the rotary output of the electric motor from the geartrain when the electric drive mode is no longer required in order to prevent unnecessary drag. As noted above, conventionally a positive-engagement dog-type clutch is used in this vehicular application to establish the coupled/uncoupled (i.e. ON/OFF) operative states, typically via movement of a sliding lock sleeve. Unfortunately, such dog clutches require high backlash angles, require high release forces to disengage, and do not allow a ratcheting-type behavior (i.e. "freewheeling" in one direction) such as in the event of an overspeed condition when the geartrain rotates faster than the electric motor shaft.

To address these and other shortcomings, the present disclosure provides a bi-directional clutch assembly 600. In general, bi-directional clutch assembly 600 includes a rotary inner race 602, a rotary outer race 604 defining sets of passive strut pockets 606 and a set of active strut pockets 608, a coil assembly 610 having a stationary (non-rotating) bobbin 612 supporting an annular coil unit 614 and an armature ring 616 which is fixed for rotation with outer race 604 and yet is axially moveable relative to coil unit 614, a set of passive strut assemblies 618 each having a passive strut 626 pivotably supported in corresponding passive strut pocket 606, and a set of active strut assemblies 620 each having an active strut 630 pivotably supported in corresponding active strut pocket 608. FIG. 11 illustrates a non-limiting embodiment of bi-directional clutch assembly 600 with armature ring 616 removed. Inner race 602 has an outer surface defining ratchet teeth 622 each having a first strut engagement surface 624 configured to locking engage an engagement portion of passive struts 626, and a second strut engagement surface 628 configured to selectively locking engage an engagement portion of active struts 630. Inner race 602 can be a separate component or integrated into a rotary component, such as a shaft, as will be shown later.

Figure 7:
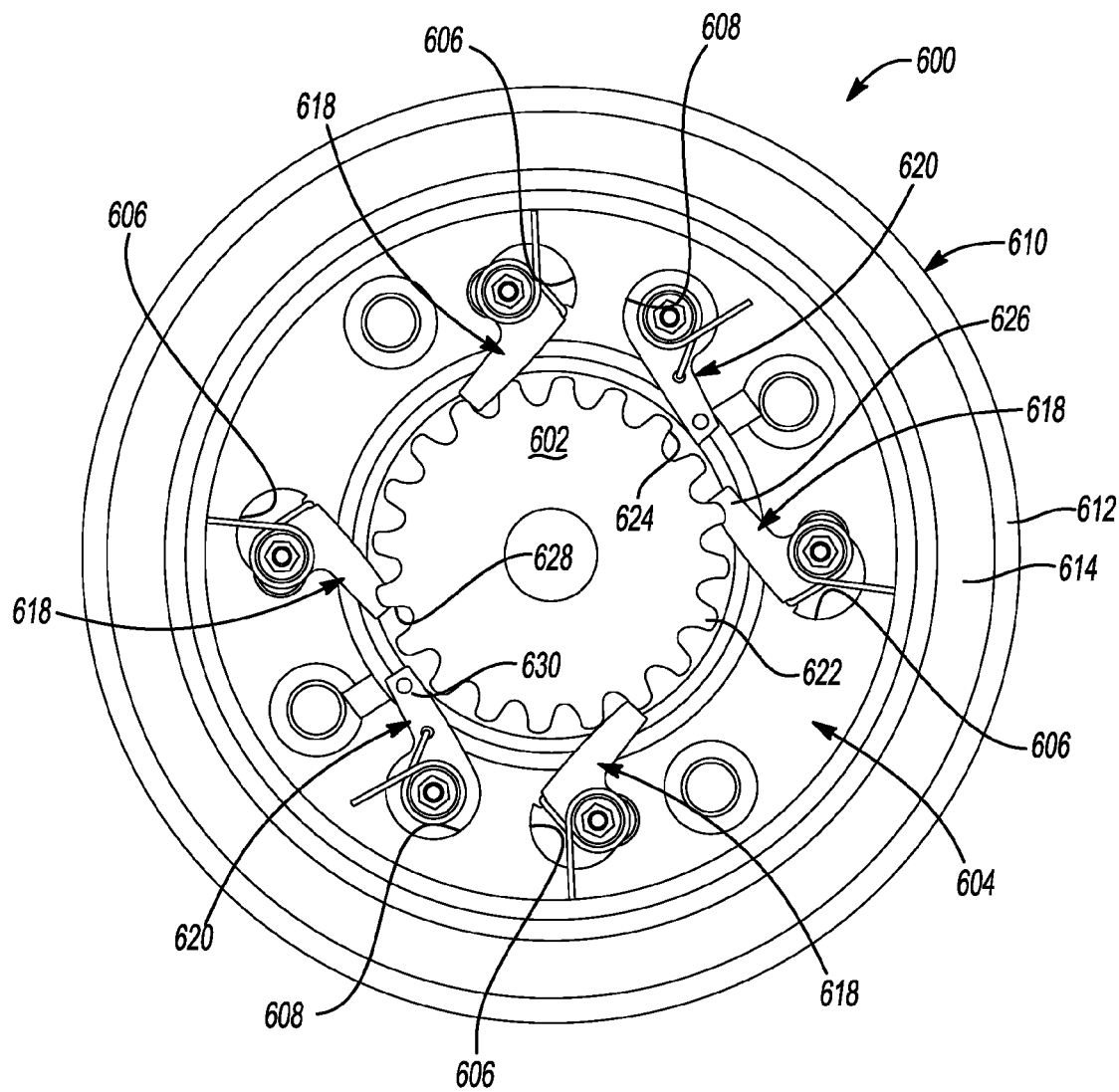
FIG. 7 is a sectional view of yet another embodiment of a bi-directional clutch assembly constructed in accordance with another aspect of the present disclosure.
Figure 8:
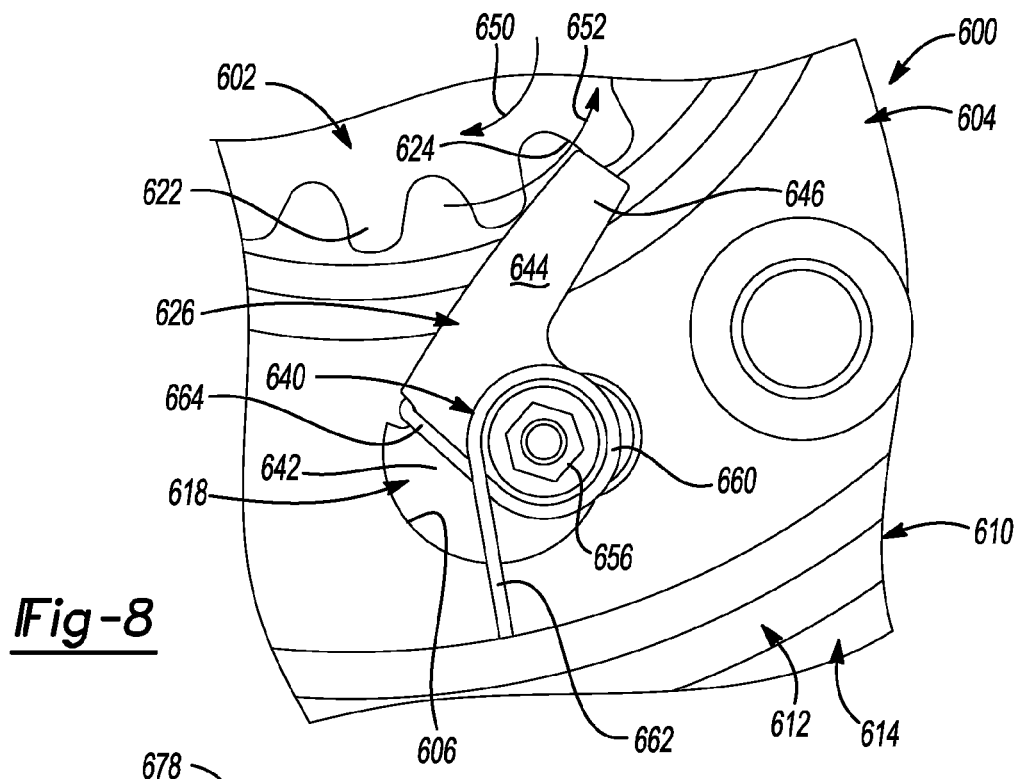
FIG. 8 is an enlarged partial view taken from FIG. 7 and illustrating the configuration of one of the passive strut assemblies in greater detail.

FIG. 8 illustrates one of passive strut assemblies 618 which generally includes passive strut 626 and a torsional biasing spring 640. Passive strut 626 includes a body segment 642 pivotably supported in passive strut pocket 606, and a leg segment 644 having an engagement tip 646 configured to selectively engage first strut engagement surface 624 of ratchet teeth 622. As is understood, passive strut 626 operates to normally establish a "coupled" state between inner rate 602 and outer race 604 in a first rotary direction (arrow 650) and a ratcheting or "freewheeling" state in a second rotary direction (arrow 652). Referring back to FIG. 7, the passive one-way clutch is configured to provide a "dual" passive strut engagement arrangement. Specifically, two pairs of diametrically opposed passive strut assemblies 618 are provided, with one pair shown engaged and the other pair shown ready to engage. This arrangement reduces the required backlash angle of ratchet teeth 622. Passive struts 626 are meant to always be engaged with ratchet teeth 622. If the speed differential between inner race 602 and outer race 604 works in the engagement direction (arrow 650), then the passive one-way clutch is engaged and transfers torque. In contrast, if the speed of outer race 604 exceeds that of inner race 602 (arrow 652), the passive one-way clutch is released and passive struts 626 will ratchet over teeth 622.

Referring again to FIG. 8, passive struts 626 are configured to be "tail-heavy", which means that due to the rotational speed, leg segment 644 of passive struts 626 moves outward in a pivoting motion relative to passive strut pocket 606 toward its deployed/locked position shown. This tail-heavy configuration is provided by locating a spring pin 656 on body segment 642 in an offset orientation relative to the pivot axis of passive strut 626. Torsion spring 640 has a looped portion 660 surrounding spring pin 656, a first leg portion 662 engaging outer race 604, and a second leg portion 664 engaging body segment 642 of passive strut 626. Leg portions 662 and 664 of spring 640 act along the same plane to avoid "tipping" of passive strut 626. This "non-centric" configuration results in passive struts 626 being naturally biased toward its deployed/locked position.

Figure 9:
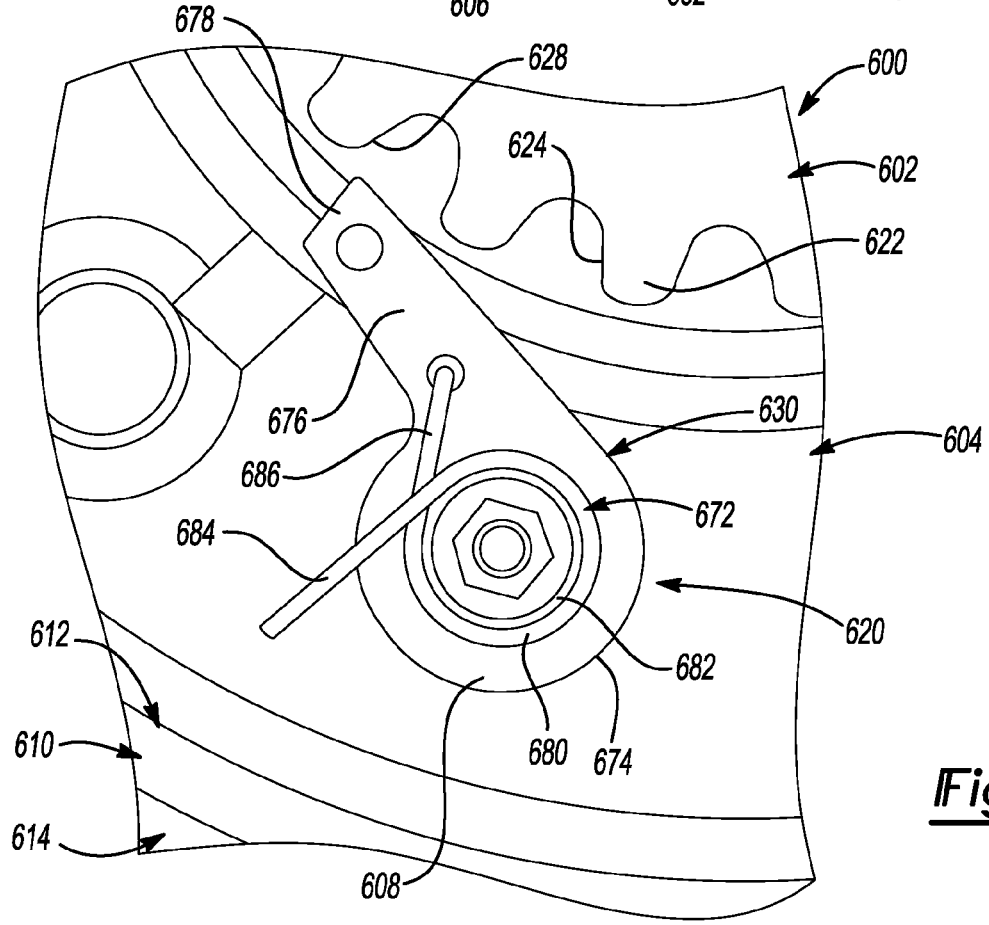
FIG. 9 is another enlarged partial view taken from FIG. 7 and illustrating the configuration of one of the active strut assemblies in greater detail.

FIG. 7 shows a pair of diametrically-opposed active strut assemblies 620 pivotally mounted in active strut pockets 608 of outer race 604 and aligned in an opposite actuation orientation with respect to passive strut assemblies 618. The number and positioning of active strut assemblies 620 is merely a design choice and not intended to limit the disclosure. FIG. 9 is an enlarged partial view of clutch assembly 600 to better illustrate the structure and operation of active strut assemblies 620 which are shown to generally include active strut 630 and a torsional biasing spring 672. Active strut 630 is a "tip-heavy" configuration having a body segment 674 supported in active strut pocket 608, and an actuation leg segment 676 having an end tip portion 678 configured to lockingly engage second strut engagement surface 628 of ratchet teeth 622. Torsion spring 672 includes a loop section 680 surrounding a "centric" spring post 682 formed on active strut 630, a first leg section 684 engaging outer race 604, and a second leg section 686 having a bent end retained in a spring bore formed in leg segment 676 of active strut 630. As outer race 604 rotates, tip portion 678 is centrifugally biased in a direction away from engagement with ratchet teeth 622 so as to naturally bias active strut 630 toward its non-deployed position (shown). Spring 672 is provided to assist in biasing strut 630 toward its non-deployed position and further assists in releasing active strut 630 from engagement with second strut engagement surface 628 of ratchet teeth 622.

Active struts 630 work in cooperation with always-engaged passive struts 626. When deployed (via energization of coil unit 614), active struts 630 function to lock inner race 602 to outer race 604 in both directions, ensuring the second, active mode for bi-directional clutch assembly 600, that is the Lock-Lock mode. The primary reason that only one pair of active struts 630 is used compared to two pair of passive struts 626 is that passive struts 626 engage first and then active struts 630 subsequently engage to provide the Lock-Lock mode. Active struts 630 never engage first, and consequently, they never have to meet strict backlash requirements for tooth engagement. Obviously, further combinations of this orientation/relationship can be used for higher torque capacity applications.

Figure 12:
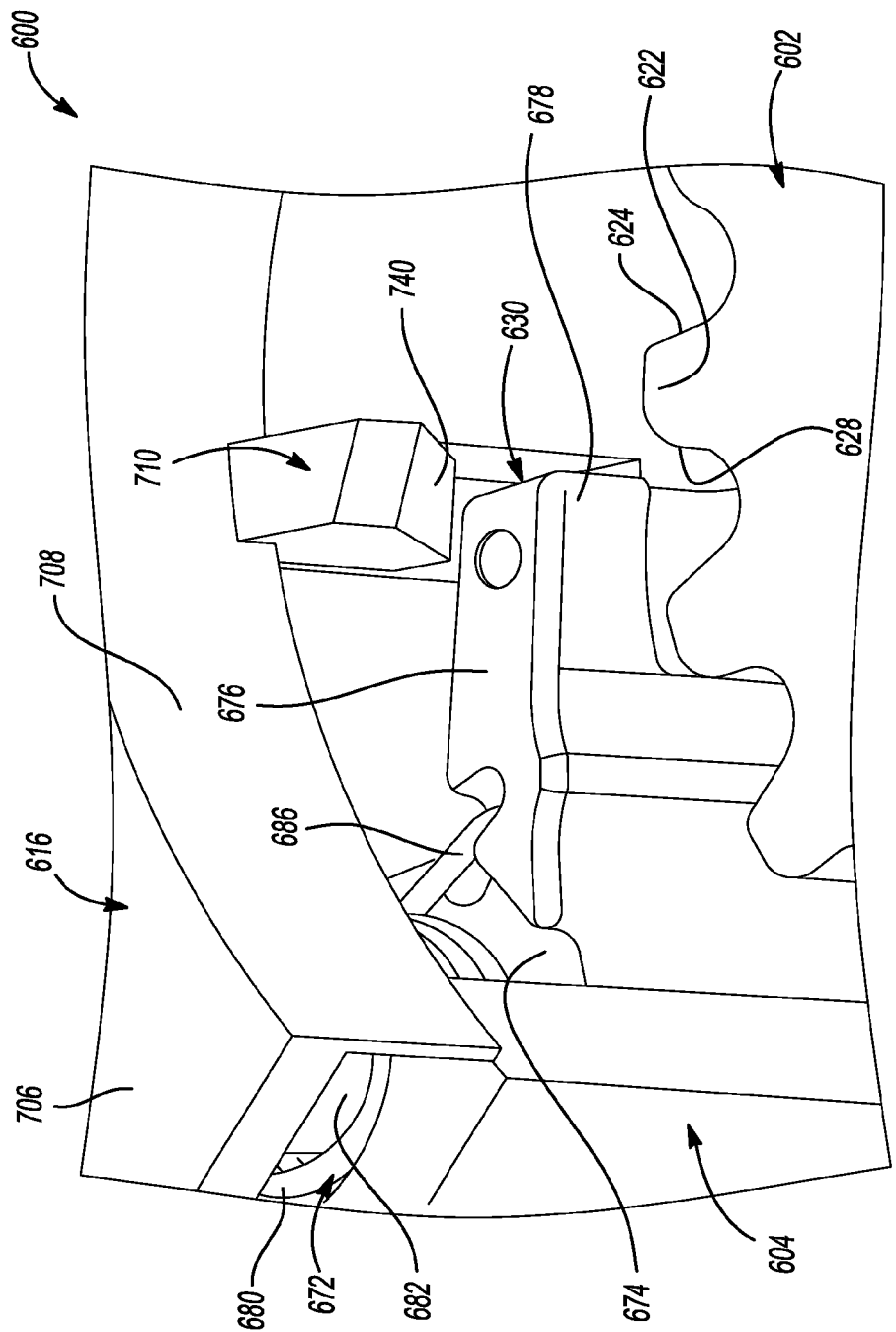
FIG. 12 is a partial isometric view showing the armature ring located in a non-actuated position with its strut engagement feature displaced from engagement with an active strut associated with the active strut assembly, whereby the active strut is maintained in its non-deployed position when the coil unit is in a non-energized state.

Referring now to FIGS. 10-12, armature ring 616 is shown in a non-actuated position relative to coil unit 614 and active struts 630. Armature ring 616 is normally biased toward its non-actuated position via a return spring 700 acting between an outer face surface 702 of outer race 604 and an inner face surface 704 of armature ring 616. Armature ring 616 is a magnetic component having a ring segment 706 overlying coil unit 614, and a lip flange segment 708 from which a pair of strut actuation features, shown as lugs 710 extend. Each strut actuation lug 710 on armature ring 616 is aligned with a corresponding leg segment 676 on active struts 630. As noted previously, armature ring 616 is fixed for common rotation with outer race 604 but is axially moveable relative thereto between its non-actuated position and an actuated position. FIG. 11 schematically illustrates that energization of coil unit 614 functions to generate a magnetic flux circuit or path 720 that is operable for magnetically attracting armature ring 616 toward coil unit 614 for causing movement thereof from its non-actuated position toward its actuated position, as is indicated by arrow 772.

Figure 13:
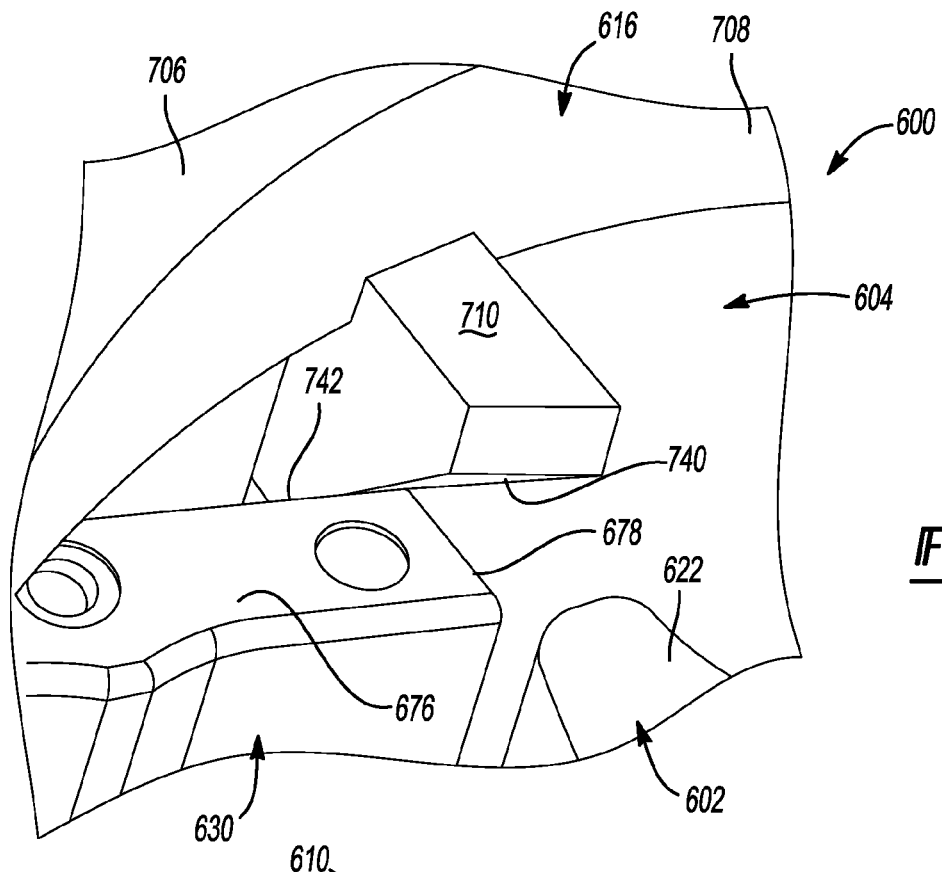
FIG. 13 is another partial isometric view, similar to FIG. 12, but now showing movement of the armature ring toward an actuated position for causing its strut engagement feature to engage the active strut and forcibly pivot the active strut from its non-deployed position toward a deployed position in response to the coil unit being shifted into an energized state.
Figure 14:
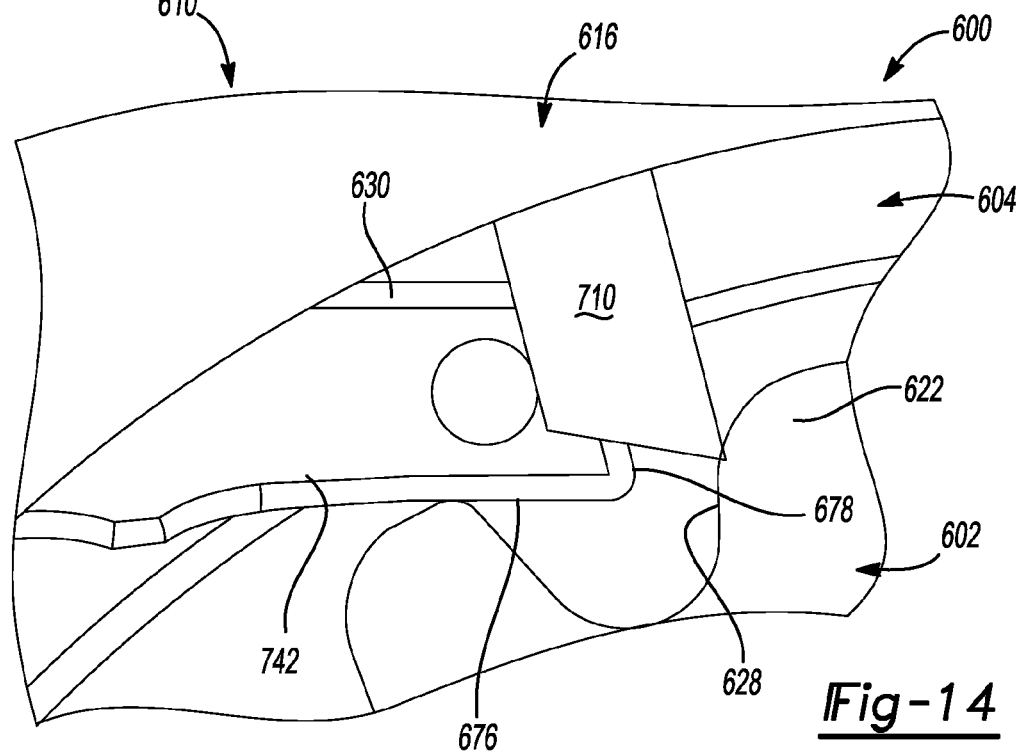
FIG. 14 is a plan view of FIG. 13.

Referring now primarily to FIGS. 12-14, selective actuation of the controllable one-way clutch of bi-directional clutch 600 will be detailed. Specifically, when coil unit 614 is energized, it causes armature ring 616 to initiate axial movement from its non-actuated position (FIG. 12) toward its actuated position, in opposition to the biasing of return spring 700. Strut actuation lugs 710 on armature ring 616 include a ramped profiled surface 740 selected based on the relationship between the range of axial movement of armature ring 616 and the corresponding arcuate range of pivotal motion of active struts 630 resulting from ramped profiled surface 740 engaging a top surface 742 of actuation leg segment 676 of active strut 630. Ramped profile surface 740 is preferably non-linear and may, without limitation, have a helical or arcuate configuration capable of pivotably driving active strut 630 from its non-deployed position to its fully-deployed position as a result of axial movement of armature ring 616 from its non-actuated position to its actuated position. FIG. 13 illustrates engagement of ramped profile surface 740 on strut actuation lug 710 with top surface 742 on active strut 630 causing pivotal movement of active strut 630 in opposition to the biasing of torsion spring 672. As armature ring 616 continues to get closer to coil unit 614, it will continue to pivot active strut 630 toward its fully-deployed position whereat tip segment 678 is locked against surface 628 of ratchet tooth 622. When power is turned off and coil unit 614 is de-energized, torsion spring 700 will forcibly move armature ring 616 axially back to its non-actuated position which in turn allows strut spring 672 to drive active strut 630 back to its non-deployed position, thereby releasing clutch assembly 600 from its Lock-Lock mode.

While bi-directional clutch assembly 600 is shown to include a passive one-way clutch and a controllable one-way clutch to provide Freewheel/Lock and Lock-Lock modes of operation, an alternative arrangement could be configured to replace the passive strut assemblies 618 with a pair of second active strut assemblies, in addition to the original pair of first active strut assemblies 620. In such a variant, a second electromagnetic actuator (coil, etc.), operated independently from the first coil unit 614, would be used to selectively actuate the second active struts. In such an alternative variant, the available modes would now include Freewheel, Lock-Lock, Ratchet Clockwise, and Ratchet Counterclockwise. Furthermore, clutch assembly 600 could be configured without the passive one-way clutch such that the controllable one-way clutch functions to shift between a Freewheel-Freewheel state (active strut 630 in non-deployed position) and a Lock-Ratchet state (active strut 630 in deployed position).

Figure 15:
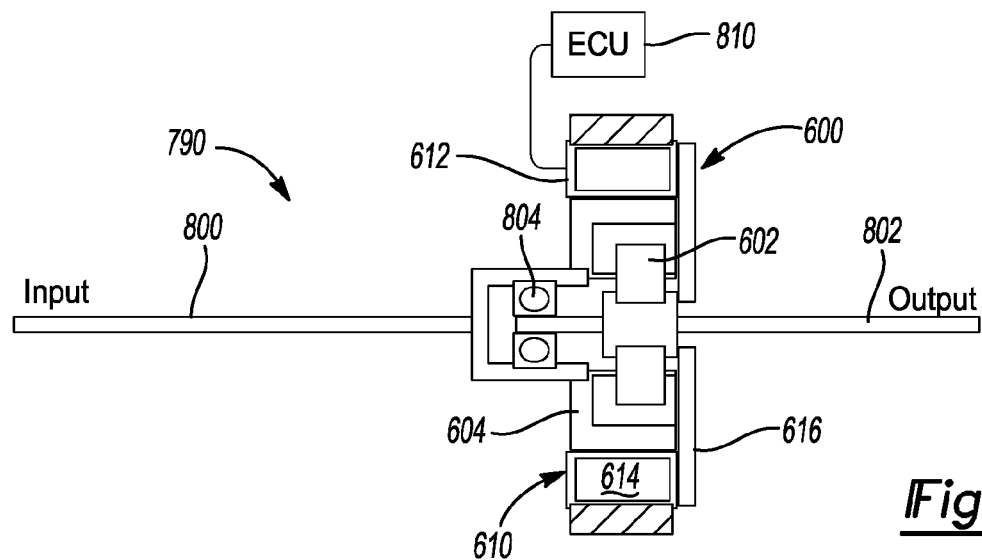
FIG. 15 is a schematic view of the bi-directional clutch assembly of FIGS. 7-14 shown installed between a rotary input member and a rotary output member for providing a freewheeling disconnect function.

FIG. 15 is a schematic illustration of a disconnect arrangement 790 with bi-directional clutch assembly 600 operably disposed between a rotary input 800 and a rotary output 802. In this arrangement, inner race 602 is fixed for common rotation with rotary output 802 while outer race 604 is fixed for common rotation with rotary input 800. Bearings 804 support rotary output 802 for rotation relative to rotary input 800 about a common rotary axis. An ECU 810 functions to energize coil unit 614 and cause movement of armature ring 616 when it is desired to establish the Lock-Lock mode. This arrangement is well-suited for use as a disconnect clutch in an axle assembly of the type used in 4WD/AWD vehicles.

Figure 16:
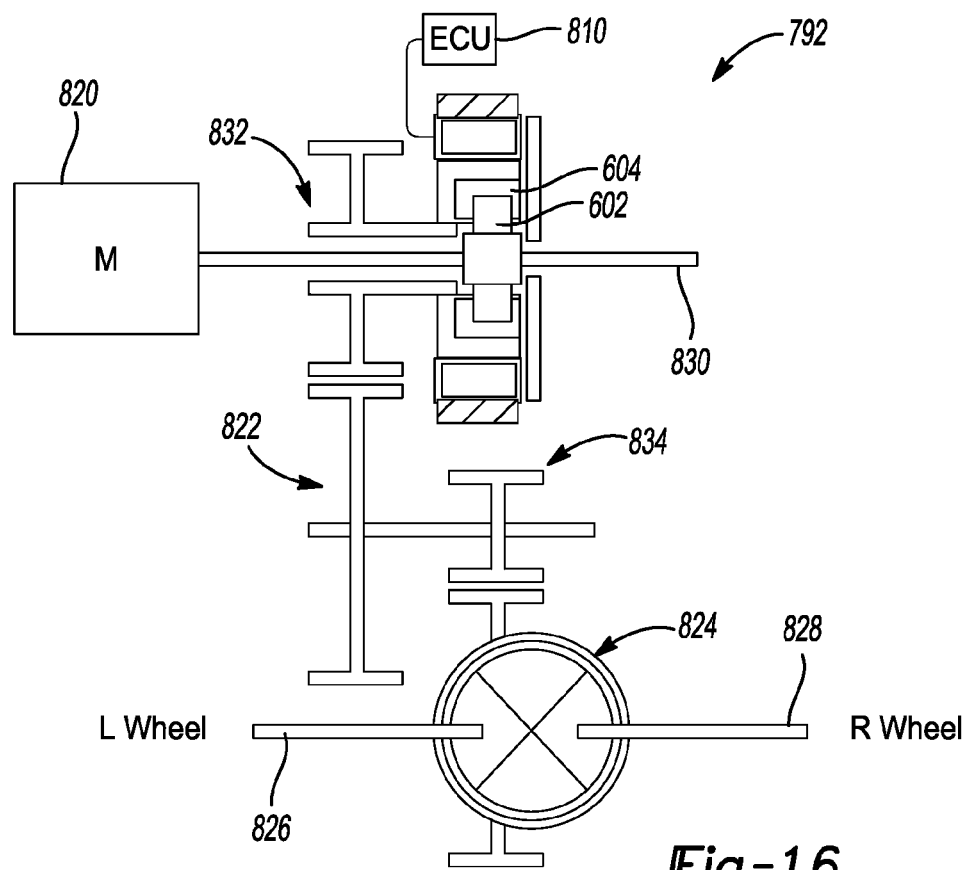
FIG. 16 is a schematic view of the disconnect-type bi-directional clutch assembly of FIGS. 7-14 now installed within an electric drive axle (EDA) assembly.

FIG. 16 is a schematic illustration of an electric drive axle (EDA) assembly 792 for a hybrid/electric vehicle and which generally includes an electric motor 820, a geartrain 822, a differential unit 824, and a pair of axleshafts 826, 828, in addition to bi-directional clutch assembly 600. In this configuration, a motor shaft 830 drives inner race 602 of clutch assembly 600 while outer race 604 drives an input gearset 832 of geartrain 822. An output gearset 834 is driven by input gearset 832 and, in turn, drives differential unit 824 for transferring drive torque to the wheels via axleshafts 826, 828. Geartrain 822 can be a single-speed reduction unit (shown) or a multi-speed variant with clutch assembly 600 disposes in any such variant between motor shaft 830 and input gearset 832 to provide the connect/disconnect function therebetween.

Figure 17:
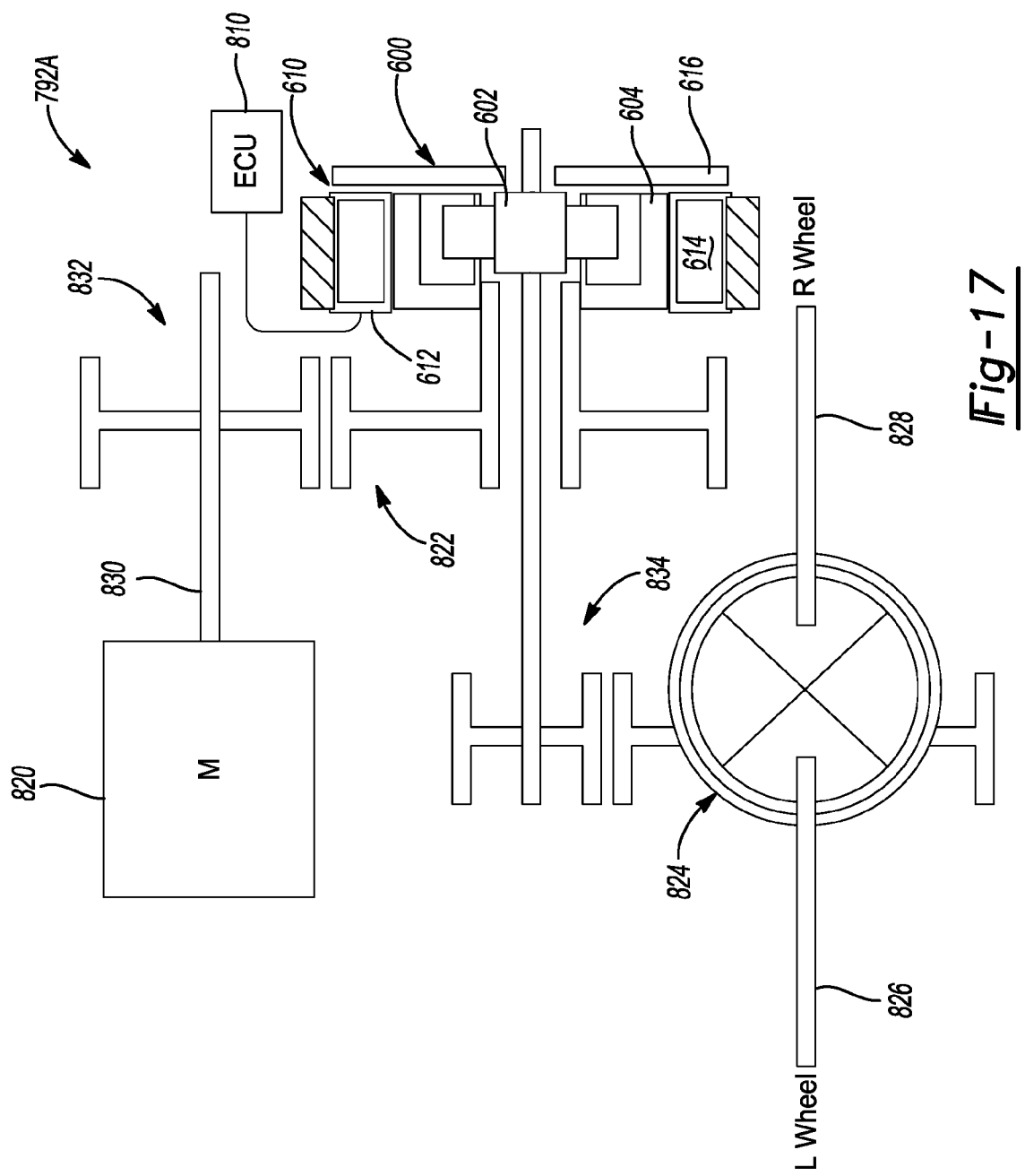
FIG. 17 is another schematic view of the disconnect-type bi-directional clutch assembly of FIGS. 7-14 now installed within another version of an EDA assembly.

FIG. 17 is an alternate embodiment of an electric drive axle assembly 792A. In this arrangement, motor 820 drives first gearset 832 while bi-directional clutch 600 is located between first gearset 832 and second gearset 834 of geartrain. In this arrangement, outer race 604 acts as the input member while inner race 602 acts as the output member driving second gearset 834 which, in turn, drives differential unit 824.

Figure 18:
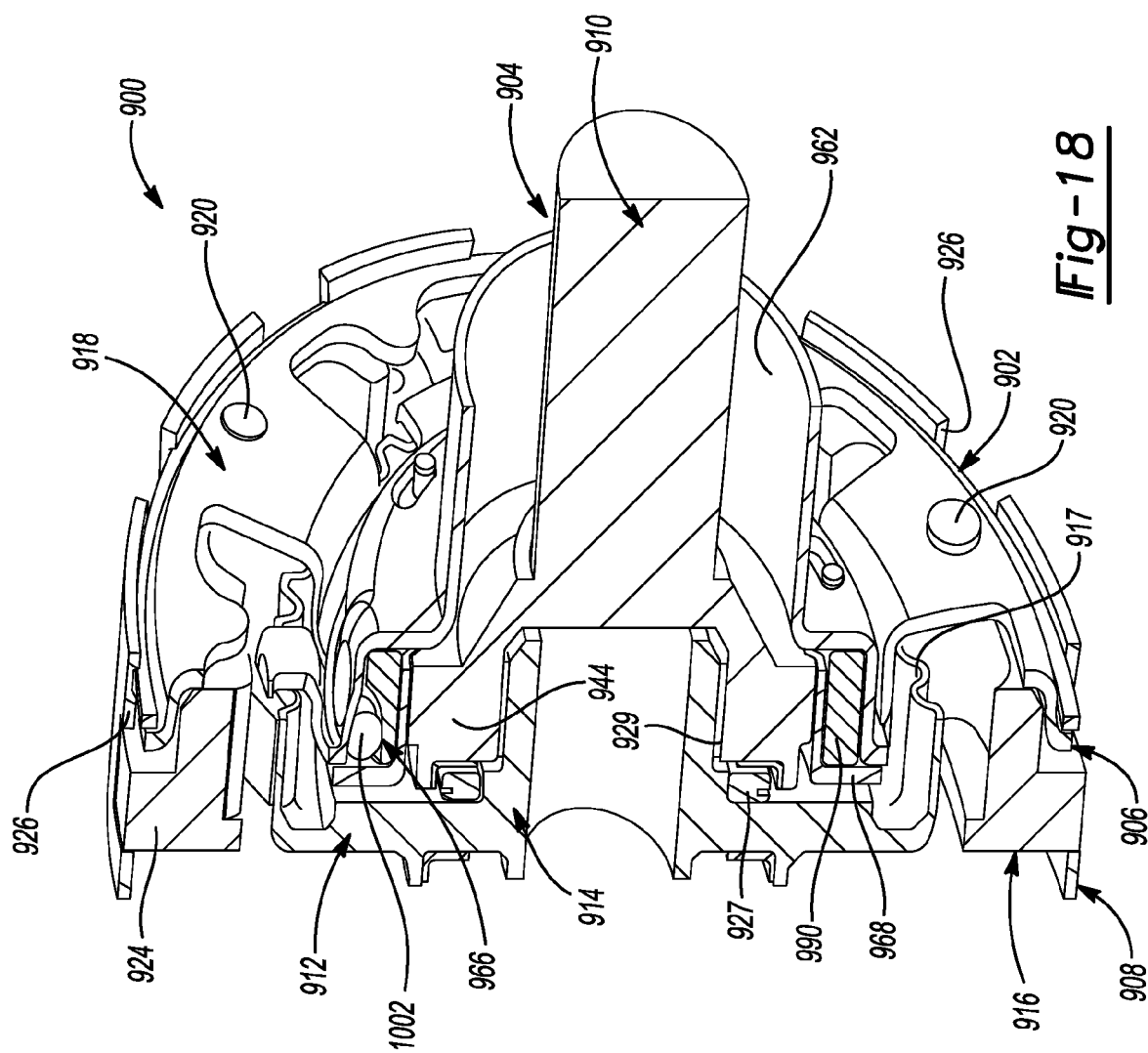
FIG. 18 is a sectional isometric view of a controllable one-way clutch constructed in accordance with yet another aspect of the present disclosure.

Referring to FIGS. 18-32, a controllable one-way clutch assembly 900, constructed in accordance with the aspects of the present disclosure, will now be described in detail. While not limited to any particular vehicular application, clutch assembly 900 is well-suited for use as a disconnect clutch in drivelines, and particularly in E-drive assemblies of the type previously mentioned. FIG. 18 is a sectional isometric view of clutch assembly 900 illustrating its basic components and configuration to include a clutch module 902 and a power-operated actuator module 904. Clutch module 902 generally includes an outer race assembly 906 rotatably driven by a rotary input component (input shell 908), a first output shaft 910 fixed for common rotation with outer race assembly 906, a rotary inner race 912 driving a second output shaft 914, and a plurality of strut assemblies 915 supported for movement on outer race assembly 906 relative to ratchet teeth 917 formed on inner race 912. Outer race assembly 906 is assembled from a non-limiting arrangement of components including a first OR member 916 and a second OR member 918 rigidly interconnected via a series of fastener 920. First OR member 916 is a powered metal component forming strut pockets 922 (FIG. 28) within which strut assemblies 915 are supported while second OR member 918 is a stamped metal component. Radially-extending drive lug 924 formed on first OR member 916 are retained in drive slots 926 formed in input shell 908 such that outer race assembly 906 is coupled for common rotation with input shell 908. A snap ring 928 is used to maintain the axial orientation between outer race assembly 906 and input shell 908. A bearing assembly 927 and a journal sleeve 929 are shown supporting second output shaft 914 for rotation relative to first output shaft 910.

Figure 28:
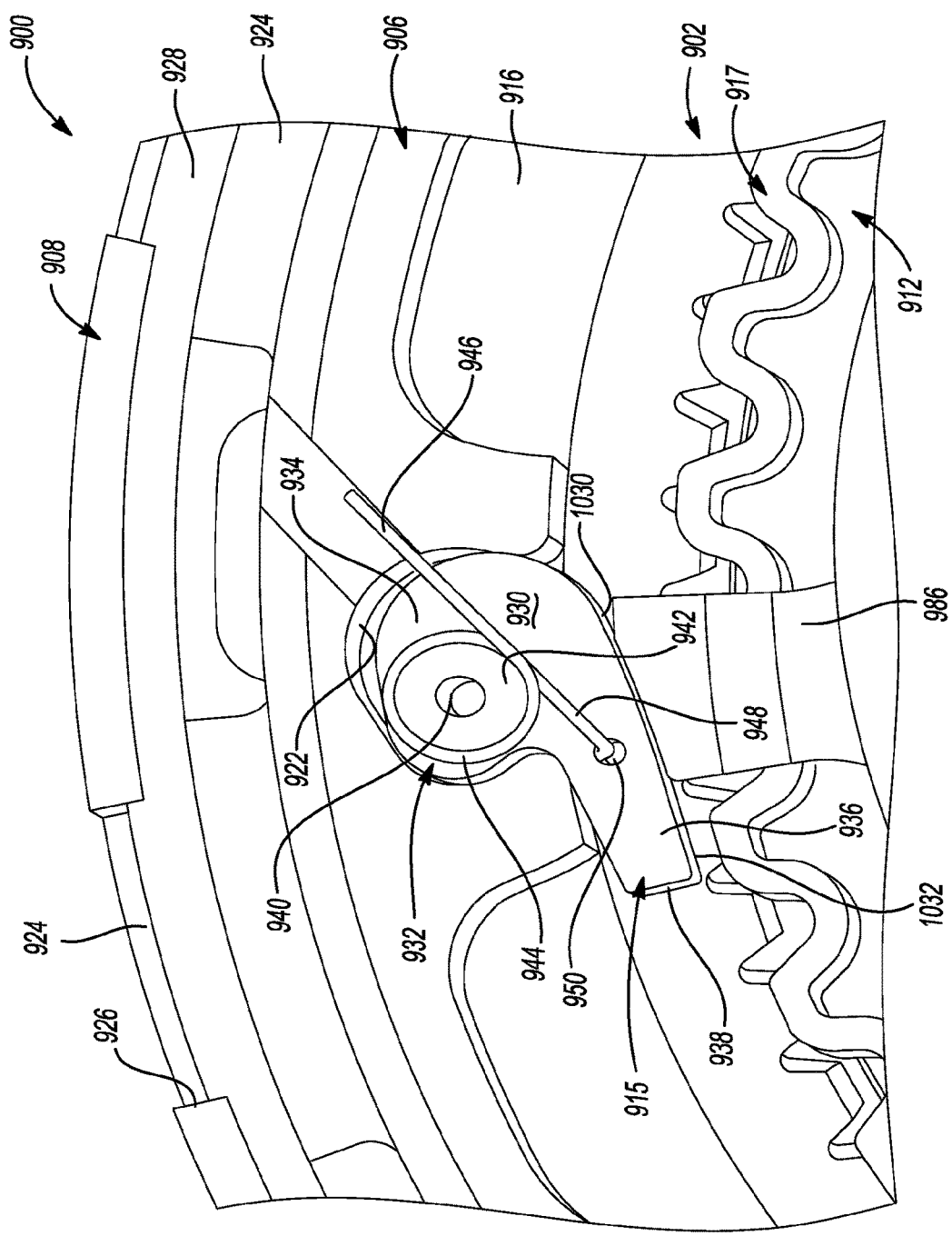
Figure 29:
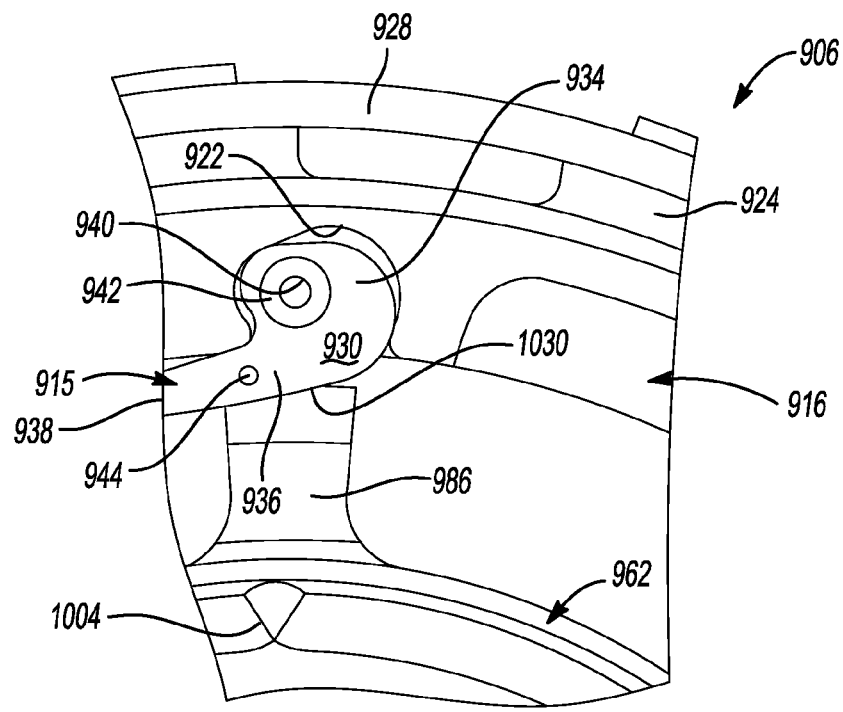

One of strut assemblies 215 is best shown in FIG. 28 to include a strut 930 and a strut spring 932. Strut 930 is shown to include a body segment 934 disposed in strut pocket 922 and an engagement segment 936 having a tip portion 938 configured to engage ratchet teeth 917 formed on inner race 912. A pivot post 940 extending through a spring post 942 of body segment 934 functions to support strut 930 for pivotal movement between a deployed position and a non-deployed position. Strut spring 932 functions to normally bias strut 930 toward its deployed position and includes a coiled segment 944 surrounding spring post 942, a first tang segment 946 engaging first OR member 916, and a second tang segment 948 disposed in a spring retention bore 950 formed in engagement segment 936 of strut 930. Struts 930 are tail-heavy which means that, due to the rotational speed of outer race assembly 906, body segment 934 will move into strut pocket 922 so as to drive engagement segment 936 toward its deployed position. Struts 930 are intended to normally operate in multiple engagements (i.e., at least two) in their deployed positions. Thus, if the relative speed differential between outer race assembly 906 and inner race 912 is in the engagement direction, clutch assembly 900 will engage and transfer torque from input shell 908 to second output shaft 914. If, however, the speed of outer race assembly 906 is less than that of inner race 912, tip portion 938 of struts 930 will ratchet over ratchet teeth 917.

As will be detailed, power-operated actuator module 904 is normally operated in a first or "power-off" condition to mechanically engage and hold struts 930 in their non-deployed positions, thereby allowing free-wheeling between out race assembly 906 and inner race 912 in both directions of relative rotation to establish the Freewheel mode. However, shifting power-operated actuator module 904 into a second or "power-on" condition acts to release struts 930 so as to allow strut springs 932 to drive struts 930 to their deployed position and into engagement with ratchet teeth 917 to establish the Lock/Ratchet mode.

Figure 19:
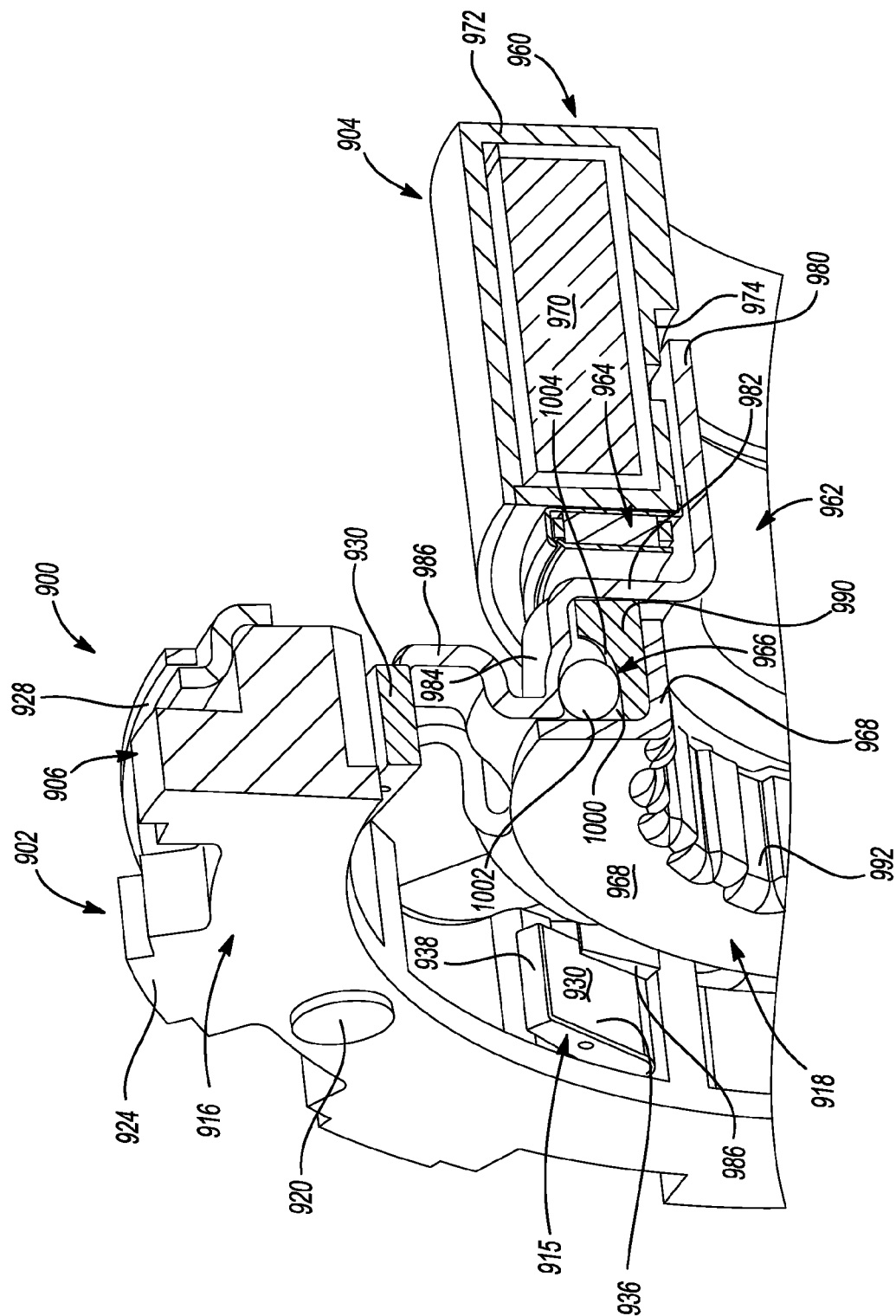
FIG. 19 is another isometric view showing the controllable one-way clutch of FIG. 18 to include a clutch module having a plurality of passive strut assemblies, and an electromagnetic actuator assembly having a coil unit, a moveable armature, and a ballramp mechanism.
Figure 20:
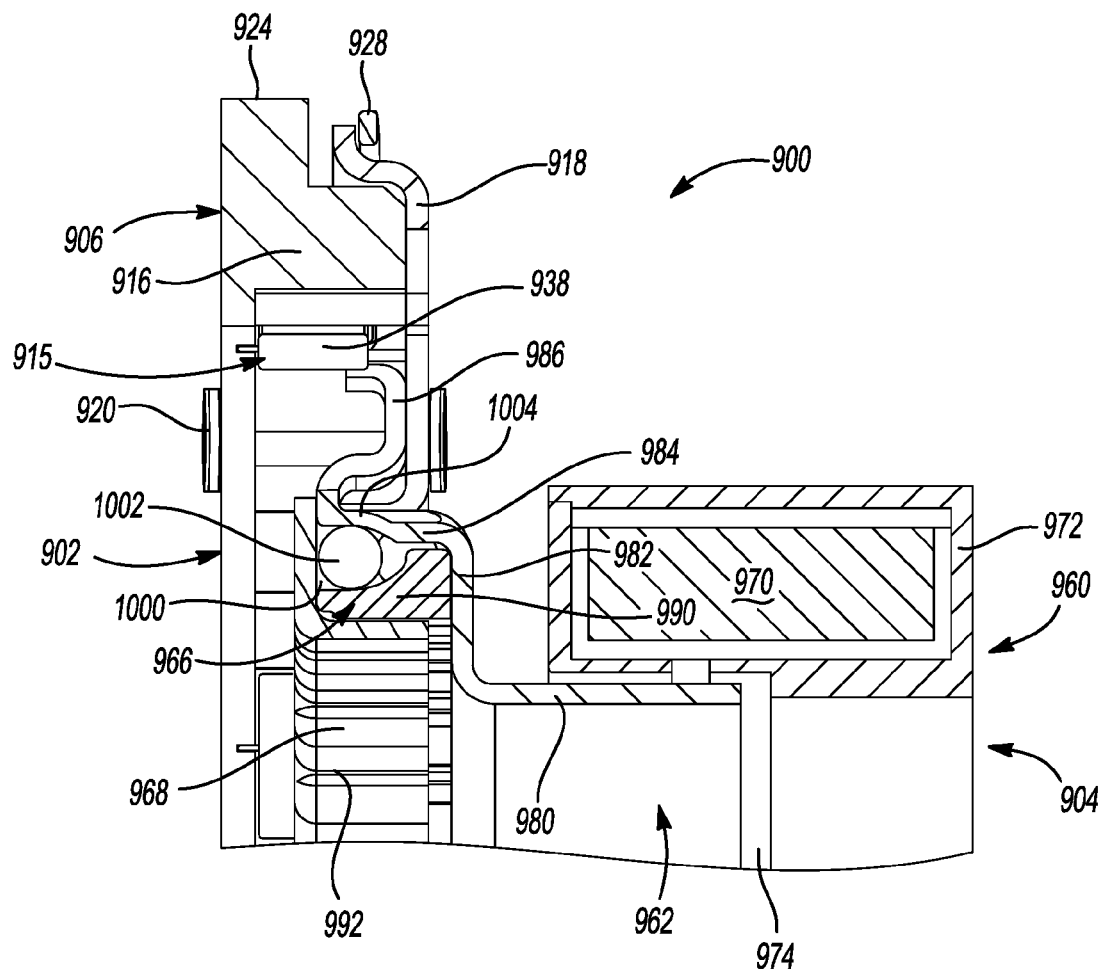
FIG. 20 is an end view of the controllable one-way clutch shown in FIG. 19.
Figure 21:
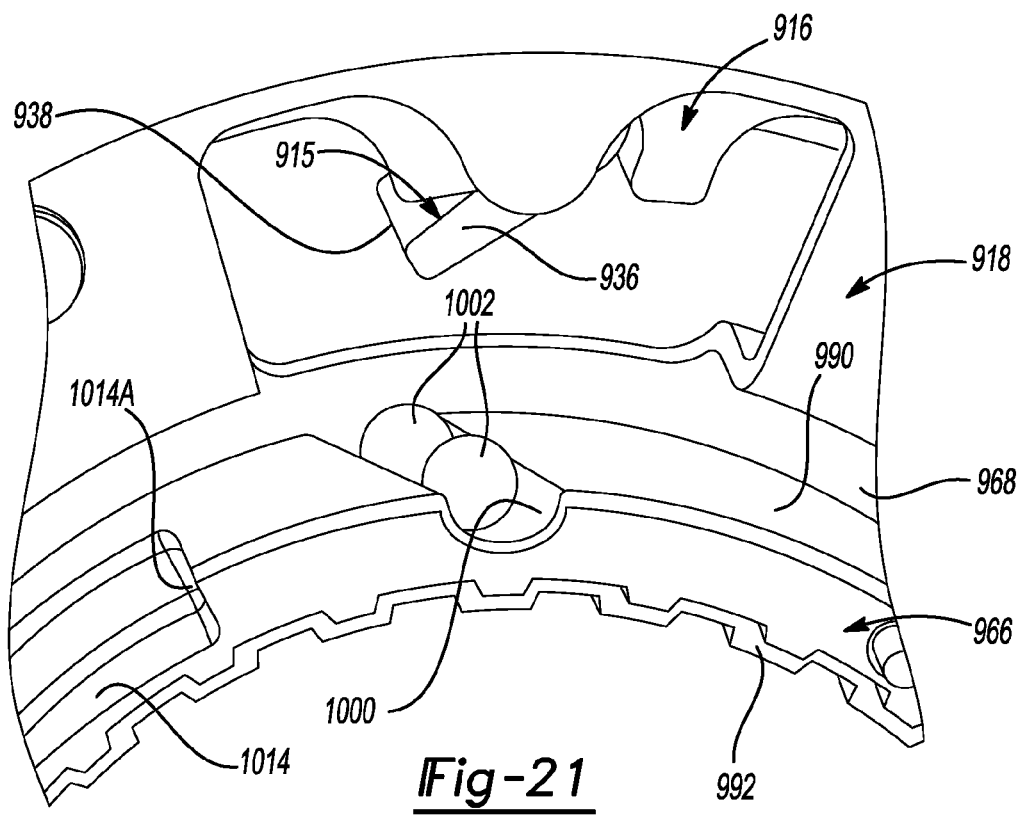
FIGS. 21 and 22 are additional views providing more clarity to the components associated with the ballramp mechanism.
Figure 22:
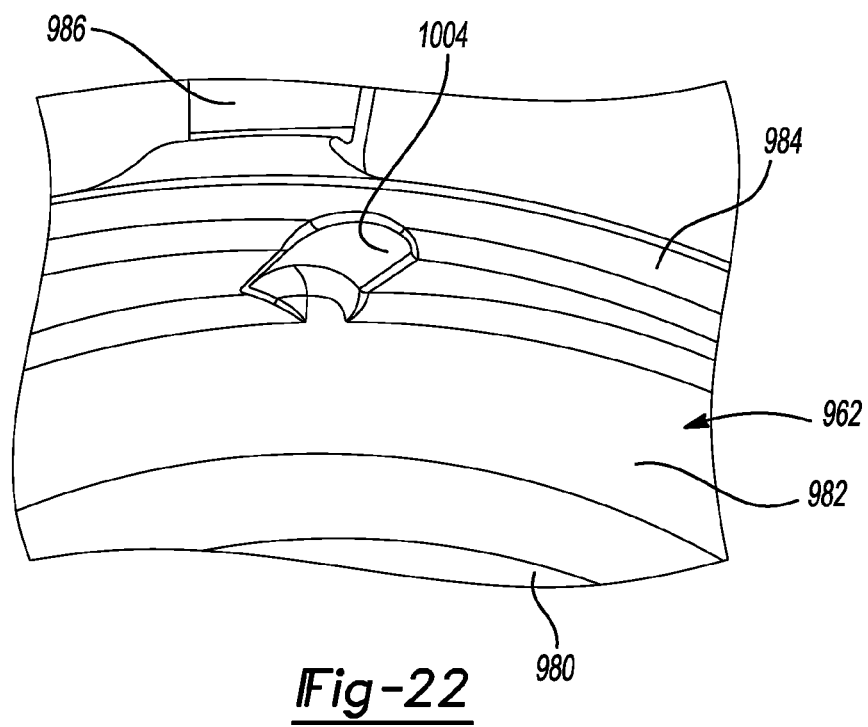

Power-operated actuator module 914 is best shown in FIGS. 19 and 20 to generally include a stationary electromagnetic actuator 960, a magnetic armature 962, a bearing assembly 964 disposed between electromagnetic actuator 960 and armature 962, and a ballramp mechanism 966 disposed between armature 962 and an annular hub segment 968 of second OR member 918. Stationary electromagnetic actuator 960 includes an annular coil unit 970 encapsulated in a non-magnetic coil housing 972. Housing 972 defines a cylindrical relief defining an armature cavity 974 configured to accommodate axial movement of armature 962. Armature 962 is configured to include a cylindrical tube segment 980 generally aligned within armature cavity 974 in coil housing 972, a radial flange segment 982 extending from tube segment 980, an axially-extending rim segment 984 extending from flange segment 982, and a plurality of blocking lug segments 986 extending radially from rim segment 984. Bearing assembly 964 is shown located between coil housing 972 and tube segment 980 of armature 962.

Ballramp mechanism 966 includes a cam ring 990 fixedly secured (i.e., pressed on, splined, etc.) to hub segment 968 of second OR member 918 for common rotation with outer race assembly 906. Note that splines 992 formed on hub segment 968 mesh with splines (See FIG. 18) formed on a raised boss segment 994 of first output shaft 910 such that outer race assembly 906 drives first output shaft 910 in response to rotation of input shell 908. Cam ring 990 defines a series of circumferentially-spaced helically-oriented cam grooves 1000. Ballramp mechanism 966 further includes rollers, such as balls 1002, disposed within cam grooves 1000. Ballramp mechanism 966 also includes a corresponding series of circumferentially-spaced ramp grooves 1004 formed in rim segment 984 of armature 962. Ramp grooves 1004 are aligned with cam grooves 1000 and retain balls 1002 therebetween.

The integration of ballramp mechanism 996 between armature 962 and second OR member 918 functions to cause both axial and rotational movement of armature 962 relative to outer race assembly 906 in response to energization (i.e., power-on) and de-energization (i.e. power-off) of coil unit 970. This combined axial and rotational movement defines a helical travel path for armature 962 between a first or "engaged" position when coil unit 970 is in its power-off condition and a second or "released" position when coil unit 970 is in its power-on condition. This helical movement of armature 962 functions to cause blocking lug segments 986 to engage and hold struts 930 in their non-deployed positions when armature 962 is located in it engaged position. In contrast, movement of armature 962 to its released position upon energization of coil unit 970 causes blocking lug segments 986 to disengage struts 930 and allow strut springs 932 to drive struts 930 into their deployed positions.

Figure 23:
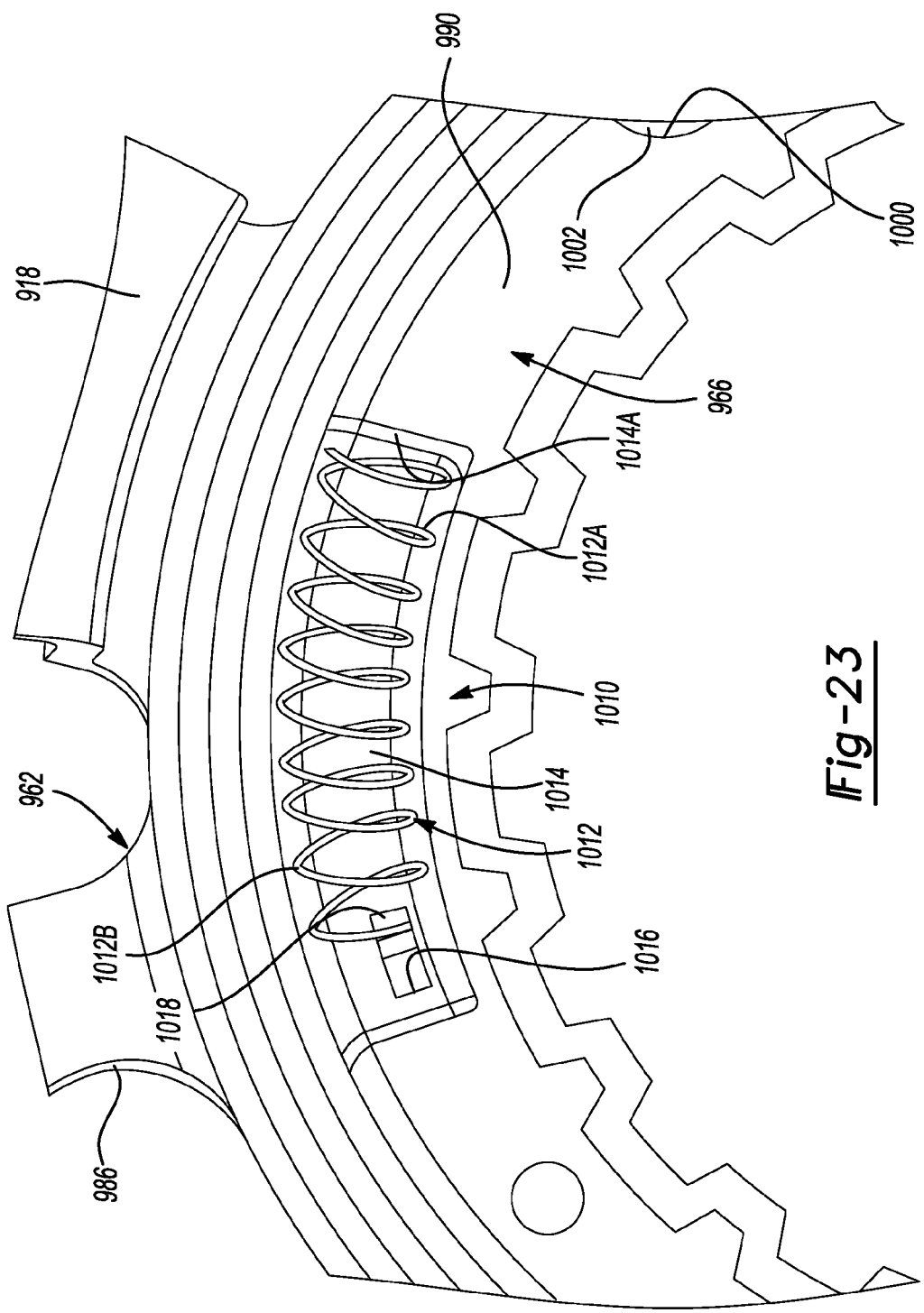
FIGS. 23 through 25 are views providing additional clarity to the components of an armature biasing arrangement associated with the electromagnetic actuator assembly.
Figure 24:
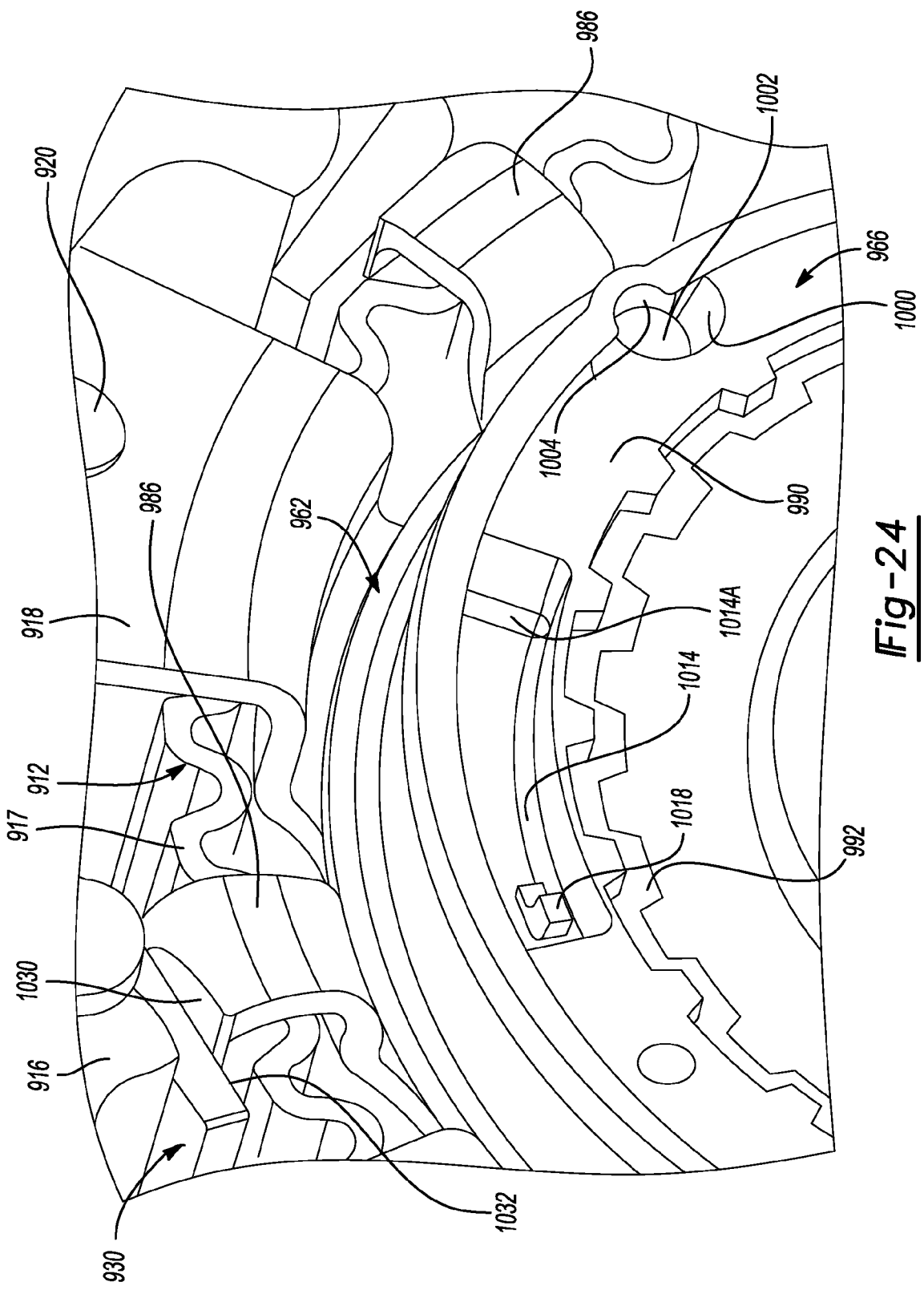
Figure 25:
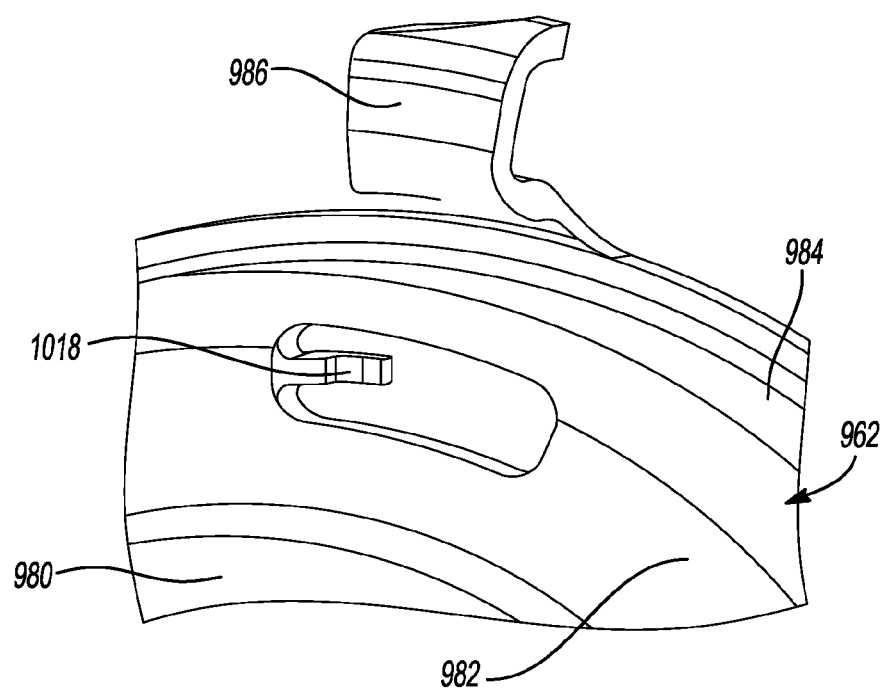

With coil unit 970 in its power-off condition, an armature biasing engagement 1010 is provided to drive armature 962 into its engaged position. Armature biasing arrangement 1010 is best shown in FIGS. 23 and 24 to include a coil spring 1012 disposed within a spring retainer cavity 1014 formed in cam ring 990. A pass-thru window 1016 is formed in spring retainer cavity 1014. A spring tab 1018 extending from armature 962 extends through window 1016 and into spring retainer cavity 1014. A first end segment 1012A of coil spring 1012 engages a first end wall 1014A of spring retainer cavity 1014 while a second end segment 1012B of coil spring 1012 engages spring tab 1018 on armature 662. Upon coil unit 970 being shifted into its power-on condition, the magnetic field generated functions to drive armature 962 from its engaged position into its released position which, in turn, functions to compress coil spring 1012 and generate an armature return force. As noted, with armature 962 held in its released position during energization of coil unit 970, blocker lug segments 986 are disengaged from struts 930, thereby allowing struts 930 to move back into their deployed positions. Subsequent de-energization of coil unit 970 functions to release the armature return force and allow coil spring 1012 to drive armature 962 back to its engaged position with blocker lug segment 986 again engaging and holding struts 930 in their non-deployed position.

Figure 30:
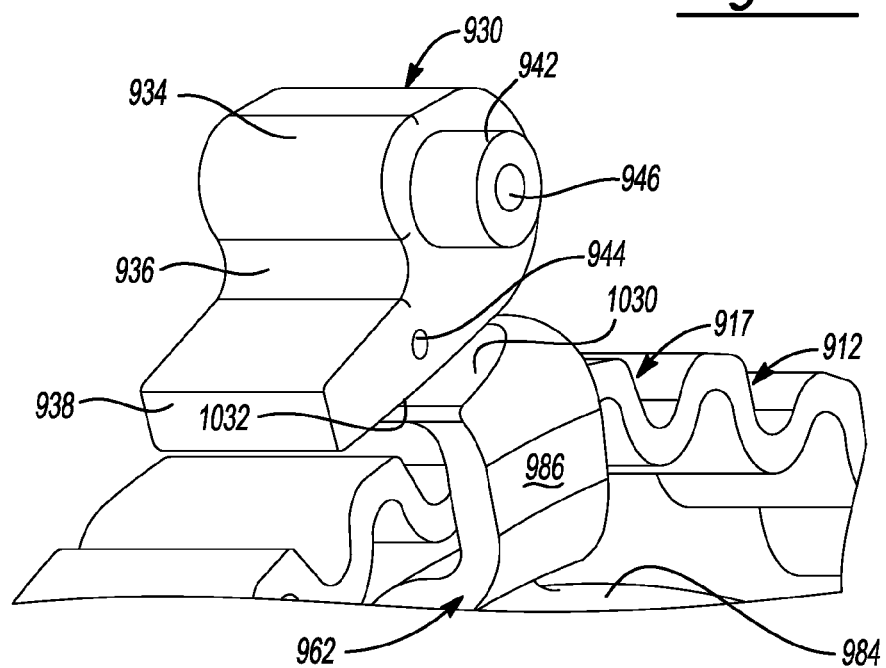

With armature 962 located in its engaged position, an upper ramped surface 1030 formed on blocker lug segments 986 engages an underside surface 1032 on engagement segment 936. The helical motion of armature 962 causes blocker lug segments 986 to raise struts 930 from their deployed position to their non-deployed positions. FIGS. 19, 20, 24, and 26-30 illustrate this engagement between upper ramped surface 1030 on blocker lugs segments 986 and underside surface 1032 on struts 930 when coil unit 970 is not energized so as to define the Freewheel mode and provide a "non-powered" disconnect function between input shell 908 and second output shaft 914. Note that blocker lugs segments 986 are only partially disposed below struts 930 so as to promote a simple release upon subsequent energization of coil unit 970. FIG. 30 illustrates a non-limiting example of a preferred contour for ramped surface 1030.

Figure 31:
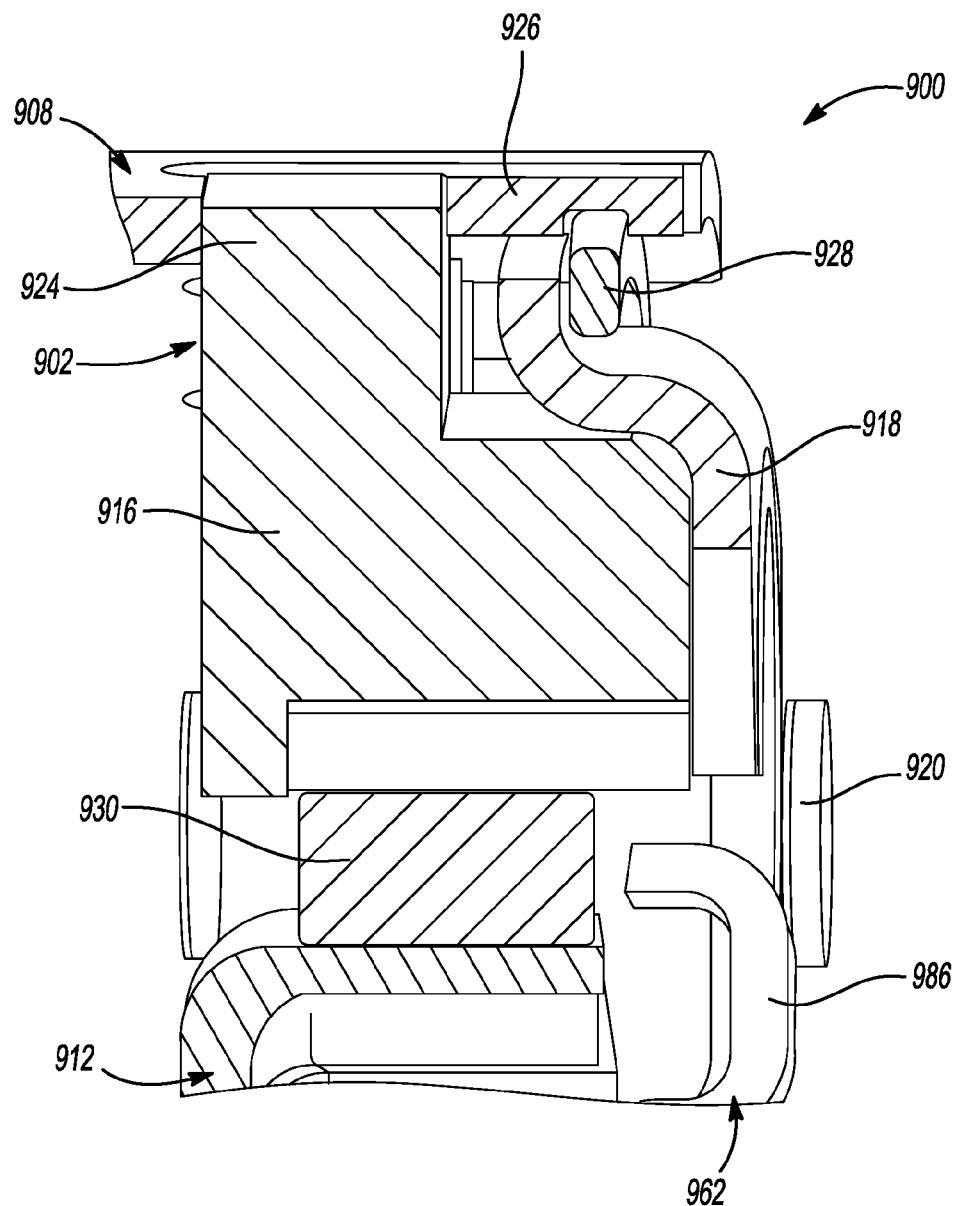
FIGS. 31 and 32 illustrate the controllable one-way clutch of FIGS. 18-26 operating in a second mode with the coil unit in a power-on condition for moving the armature into a released position displaced from the struts for permitting movement of the struts into a deployed position engaged with ratchet teeth.
Figure 32:
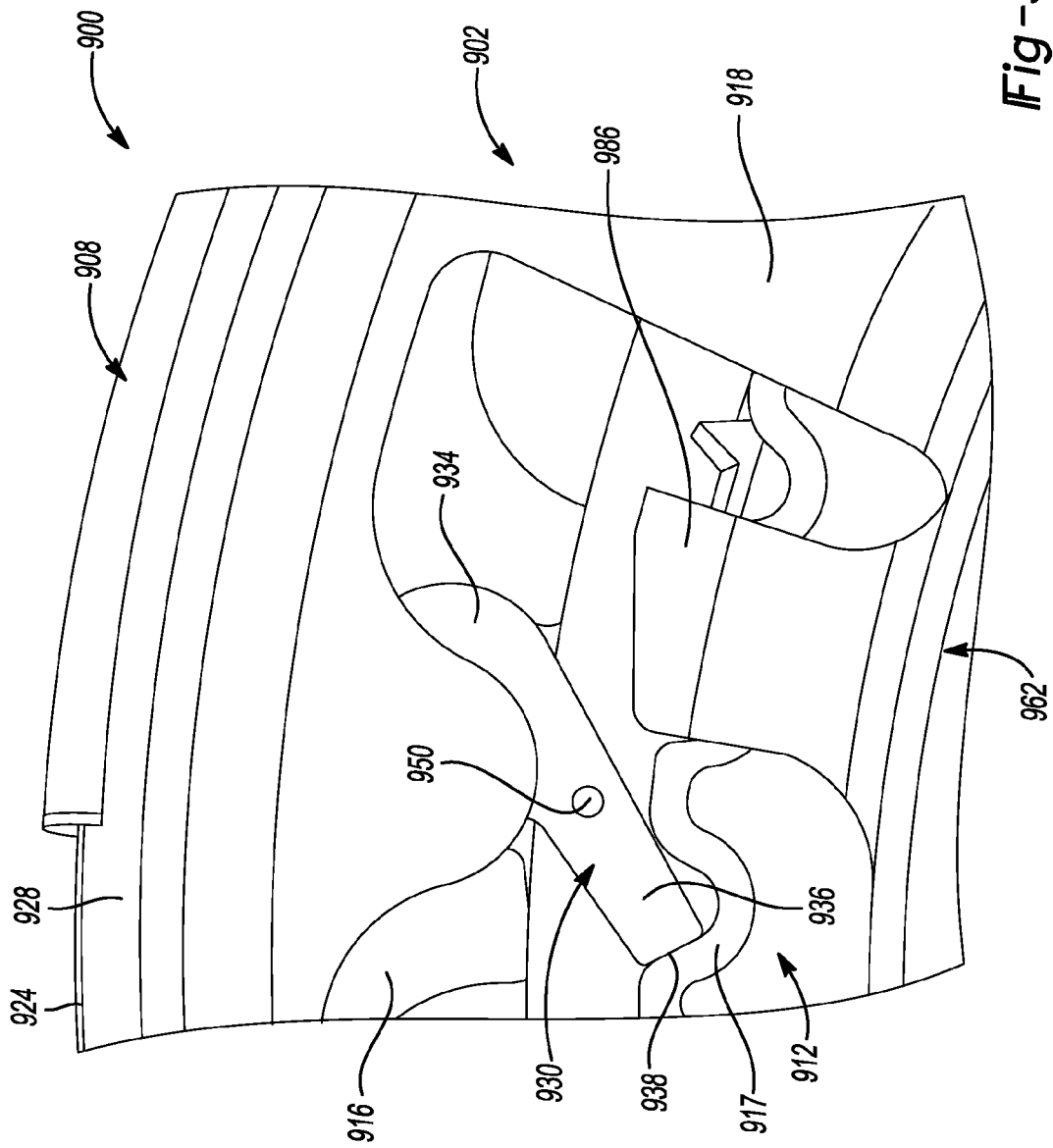

FIGS. 18, 31 and 32 illustrate movement of armature 962 into its released position, in opposition to the biasing of armature spring 1012, in response to coil unit 970 being energized into its power-on condition. Due to the helical trajectory armature 962 follows, it is both axially retracted from, and rotated relative to, struts 930 in response to the magnetic field generated by coil unit 970. The axial vector of this helical trajectory is associated with retraction of tube segment 980 of armature 962 relative to armature cavity 974. Likewise, the rotational vector of this helical trajectory is generated by ballramp mechanism 966 in response to axial retraction of armature 962. The characteristic (i.e. depth, width, angulation, length, etc.) of cam grooves 1000 and ramped grooves 1004 dictate the relationship between the axial and rotational components of the helical trajectory.

Figure 26:
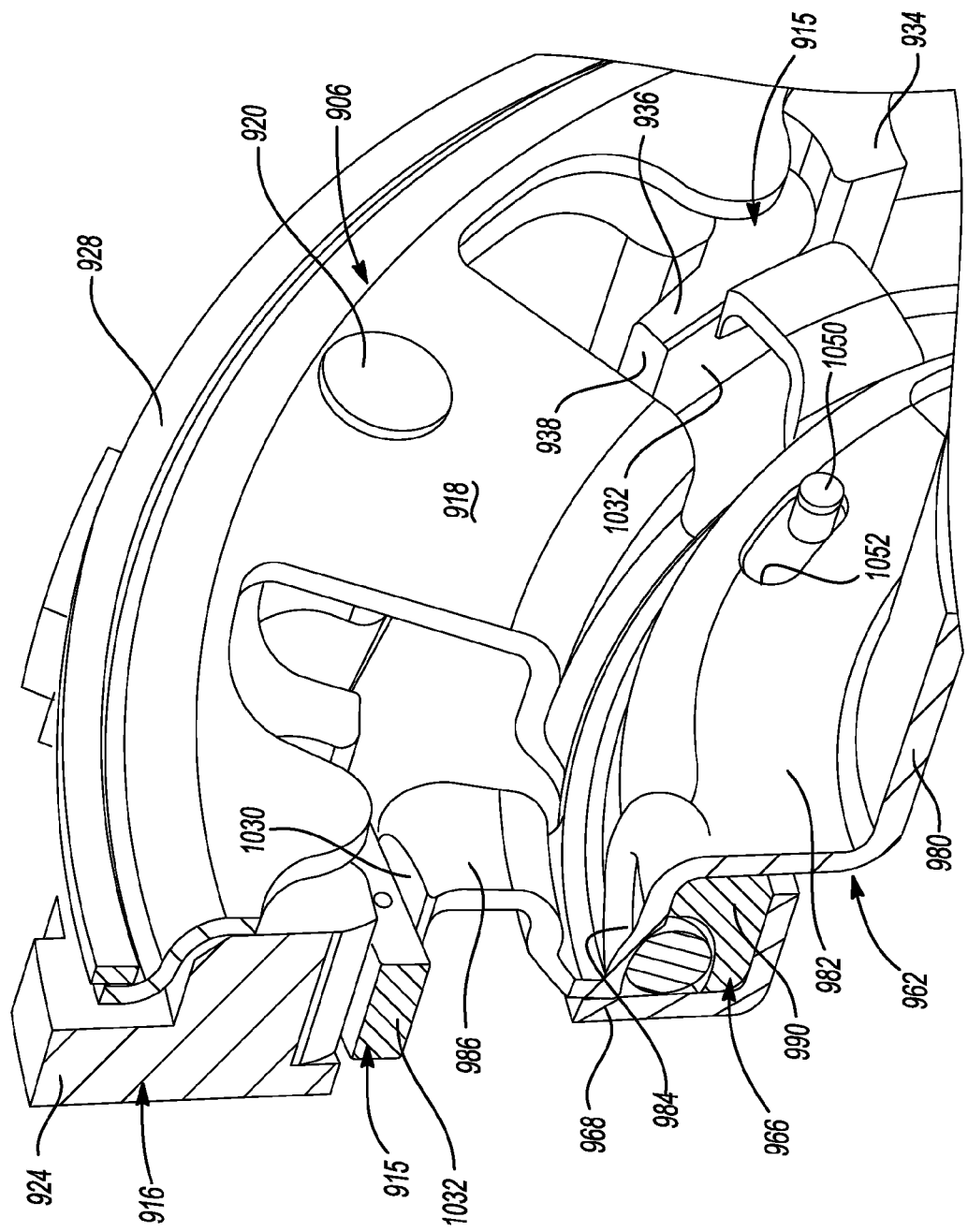
FIG. 26 is a partial isometric view illustrating a lost-motion type of travel-limiting arrangement disposed between the armature and the ballramp mechanism.
Figure 27:
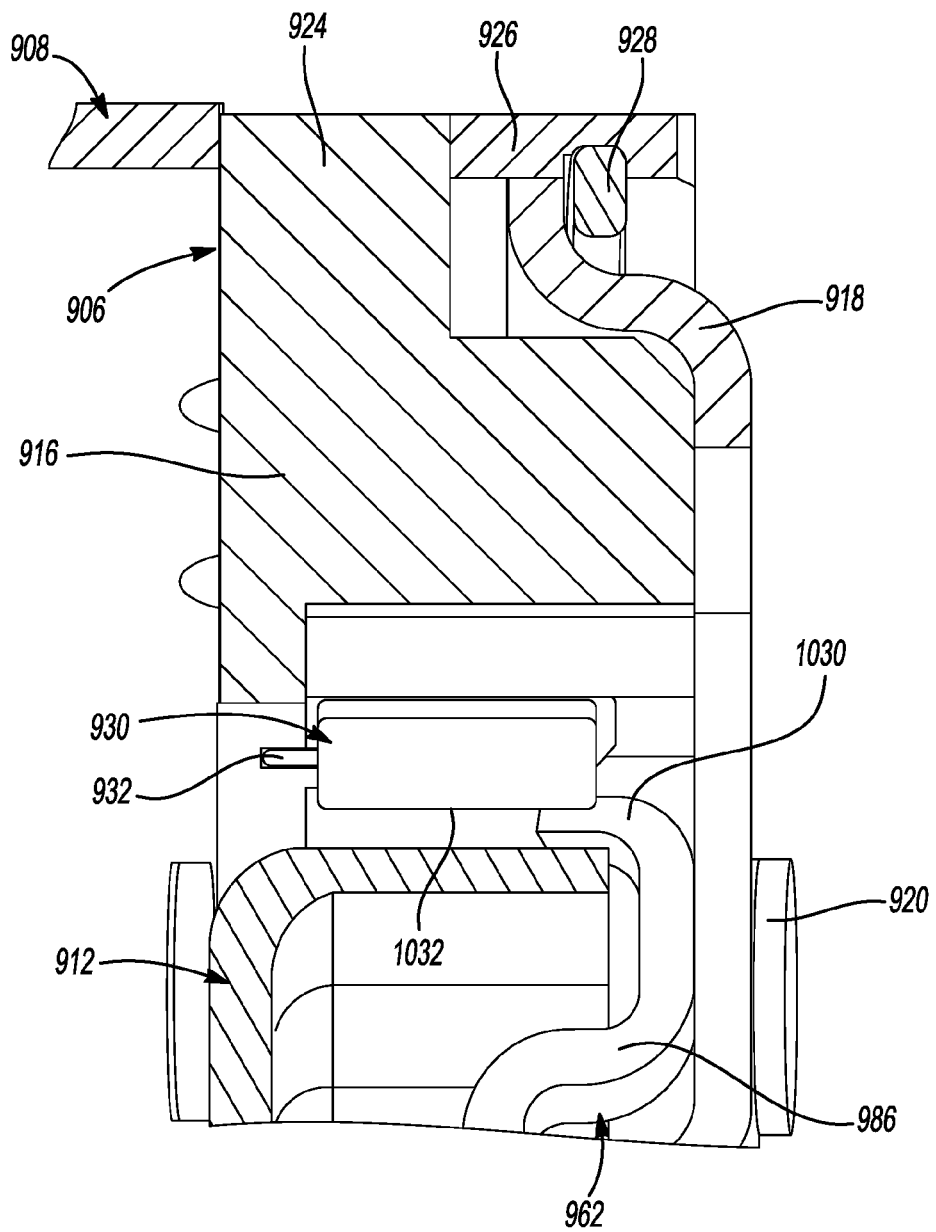
FIGS. 27 through 30 illustrate the controllable one-way clutch of FIGS. 18-26 operating in a first mode with the coil unit in a power-off condition and the armature located in an engaged position for mechanically engaging and holding the struts in a non-deployed position so as to establish a disconnect function.

FIG. 26 illustrates a travel-limiting arrangement configured to properly locate armature 962 in each of its engaged and released positions. Specifically, a post 1050 extending axially from cam ring 990 is retained in an elongated arcuate slot 1052 formed in flange segment 982 of armature 962. With armature 962 located in its engaged position (shown), post 1050 engages a first end of slot 1052. In contrast, when armature 962 is located in its released position, post 1050 engages the opposite end of slot 1052. The biasing force exerted by armature spring 1012 on armature 962, when armature 962 is located in its engaged position is selected to work cooperatively with the linear-to-rotary conversion characteristic of ballramp mechanism 966 to assure that struts 930 are fully located in their non-deployed positions to avoid unintended contact with ratchet teeth 917.

Clutch assembly 900 is distinct in its configuration from each of the previously disclosed clutch assemblies shown in FIGS. 1-14 in that power-operated actuator 904 is not employed to deploy an active strut. Rather, clutch assembly 900 utilizes power-operated actuator 904 to block deployment of passive struts 930 in an effort to provide the power-off disconnect feature and a "power-on" connect feature. However, those skilled in the art can recognize the ability to install clutch assembly 900 into any of the E-drive arrangements in FIGS. 16 and 17 and/or into the driveline disconnect arrangement in FIG. 15.

In general, clutch assembly 900 is comprised of an outer race including pockets for a plurality of ratchet-type passive struts, an electromagnetic actuator including a stationary coil unit and a moveable armature which rotates with the outer race, a ballramp mechanism, and an inner race having ratchet teeth normally engaged by the passive struts to provide a Lock/Ratchet mode of operation.

The outer race is an assembly comprised of a PM first outer race member formed to include all net-shaped features (i.e., strut pockets, spring connections, etc.) and a stamped second outer race member configured to transfer torque from the input component to an output component. Preferably, the input component is a rotary, large diameter shell fixedly coupled to the outer race assembly while the output component is a shaft coupled for rotation with the second outer race member. The passive struts are arranged to work in multiple engagements with at least two of the passive struts always engaged with the ratchet teeth on the inner race. A strut spring normally biases each of the passive struts toward its fully deployed position for maintaining low speed engagement. The passive struts are tail-heavy to drive the passive struts toward their fully deployed positions at higher rotary speeds of the outer race assembly.

The moveable armature has strut blocking features configured to engage and hold the passive struts in a tucked, non-deployed position when the armature is located in an engaged position while the coil unit is powered off. An armature biasing spring functions to bias the armature toward its engaged position. Upon the occurrence of a power-on condition, the armature moves to a released position due to it attraction to the coil unit's magnetic field. This movement of the armature between its engaged and released positions is not linear (i.e., axial or back-and-forth), but rather the armature moves in a helical trajectory due to integration of ballramp mechanism between the outer race assembly and the armature. Thus, movement of the armature from its engaged position to its released position causes the strut blocking features to retract axially away from the struts as well as rotate to a location behind the strut. This allows the struts to move back to their fully deployed positions. When the coil unit is subsequently powered off, the armature extends axially and rotates toward the struts, whereby the strut blocking features engage the struts and mechanically move them from their fully deployed position into their non-deployed position. The coil and armature actuation arrangement can be driven by several magnetic field concepts. The helical armature trajectory provided by integration of the ballramp unit provides advantages in armature movement by combining axial and rotary motion.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed:

1. A controllable one-way clutch assembly operably disposed between a rotary input member and a rotary output member, the clutch assembly comprising:
   a first clutch component coupled for rotation with the input member and defining a plurality of strut pockets;
   a second clutch component coupled for rotation with the output member and defining ratchet teeth;
   a plurality of struts each mounted in a corresponding one of the strut pockets for movement between a deployed position engaged with the ratchet teeth and a non-deployed position disengaged from the ratchet teeth;
   a plurality of strut springs each associated with a corresponding one of the struts and configured to bias the strut toward its deployed position; and
   a power-operated actuator operable in a power-off condition to mechanically engage and hold each of the struts in its non-deployed position and further operable in a power-on condition to disengage each of the struts and allow the strut springs to drive the struts to their deployed positions, wherein the power-operated actuator includes a stationary coil unit, an armature moveable relative to the coil unit and the struts between an engaged position whereat the armature engages and holds the struts in their non-deployed positions and a released position whereat the armature is released from engagement with the struts, an armature biasing arrangement configured to bias the armature toward its engaged position, and a ballramp mechanism operable to move the armature in a helical trajectory between its engaged and released positions.

2. The clutch assembly of claim 1, wherein the armature includes strut blocking features arranged to engage and hold each of the struts in its non-deployed position when the armature is located in its engaged position and the coil unit is operating in its power-off condition, and wherein the helical trajectory of the armature causes the strut blocking features to disengage the struts when the armature is moved to its released position in response to the coil unit being shifted into its power-on condition.

3. The clutch assembly of claim 2, wherein the strut blocking features are radially-extending lugs extending from the armature.

4. The clutch assembly of claim 1, wherein the ballramp mechanism is disposed between the armature and the first clutch component.

5. The clutch assembly of claim 4, wherein the ballramp mechanism includes a cam ring fixed to the first clutch component and having a cam groove formed therein, a ramp groove formed in the armature, and a ball disposed between the cam groove and the ramp groove, and wherein the cam groove and ramp groove are aligned such that axial movement of the armature relative to the coil unit causes corresponding rotary movement of the armature, thereby defining the helical trajectory of the armature.

6. The clutch assembly of claim 5, wherein the armature defines an elongated slot, a post extends axially from the cam ring into the slot and is slideable within the slot, and wherein the rotary movement of the armature is limited by the post engaging first and second ends of the slot.

7. The clutch assembly of claim 6, wherein when the armature is located in its engaged position the post engages the first end of the slot, and wherein when the armature is located in its released position the post engages the second end of the slot.

8. The clutch assembly of claim 1, wherein the clutch assembly is a motor disconnect clutch installed in an electric transaxle or an electric drive axle to establish a power-off disconnect function between a motor driving the input member and a geartrain driving the output member.

9. A controllable one-way clutch assembly operably disposed between a rotary input member and a rotary output member, the clutch assembly comprising:
   an outer race coupled for rotation with the input member and defining a plurality of strut pockets;
   an inner race coupled for rotation with the output member and defining ratchet teeth;
   a plurality of struts each mounted in a corresponding one of the strut pockets for movement between a deployed position engaged with the ratchet teeth and a non-deployed position disengaged from the ratchet teeth, wherein each of the plurality of struts is biased toward its deployed position; and
   a power-operated actuator operable in a power-off condition for holding each of the struts in its non-deployed position and a power-on condition for releasing each of the struts and allowing the struts to move into their deployed positions, wherein the power-operated actuator includes a stationary coil unit, an armature moveable relative to the coil unit and the struts between an engaged position whereat the armature engages and holds the struts in their non-deployed positions and a released position whereat the armature is released from engagement with the struts, an armature biasing arrangement biasing the armature toward its engaged position, and a ballramp mechanism operable to move the armature both axially and rotationally between its engaged and released positions.

10. The clutch assembly of claim 9, wherein the armature includes strut blocking features arranged to engage and hold each of the struts in its non-deployed position when the armature is located in its engaged position and the coil unit is operating in its power-off condition, and wherein the rotational and axial movement of the armature causes the strut blocking features to disengage the struts when the armature is moved to its released position in response to the coil unit being shifted into its power-on condition.

11. The clutch assembly of claim 10, wherein the strut blocking features are radially-extending lugs extending from the armature.

12. The clutch assembly of claim 9, wherein the ballramp mechanism is disposed between the armature and the outer race.

13. The clutch assembly of claim 12, wherein the ballramp mechanism includes a cam ring fixed to the outer race and having a cam groove formed therein, a ramp groove formed in the armature, and a ball disposed between the cam groove and the ramp groove, and wherein the cam groove and ramp groove are aligned such that axial movement of the armature relative to the coil unit causes corresponding rotational movement of the armature.

14. A controllable one-way clutch assembly operably disposed between first and second rotary members, the clutch assembly comprising:
a first clutch component coupled for rotation with the first rotary member;
a second clutch component coupled for rotation with the second rotary member and including ratchet teeth;
a strut pivotally supported on the first clutch component for movement between a deployed position engaged with the ratchet teeth and a non-deployed position disengaged from the ratchet teeth; and
a power-operated actuator including a stationary coil unit, an armature that is moveable relative to the coil unit and the strut between an engaged position when the coil unit is operating in a first condition and a released position when the coil unit is operating in a second condition, and a ballramp mechanism operable to cause the armature to move along a helical path between its engaged and released positions, wherein the armature is operable in its engaged position to hold the strut in its non-deployed position and is further operable in its released position to disengage the strut and allow the strut to move toward its deployed position.

15. The clutch assembly of claim 14 further including a strut spring configured to bias the strut toward its deployed position, and wherein the power-operated actuator further includes an armature biasing arrangement configured to bias the armature toward its engaged position.

16. The clutch assembly of claim 15, wherein the first condition of the coil unit is a power-off condition for allowing the armature biasing arrangement to drive the armature into its engaged position whereby the strut is held by the armature in its non-deployed position, and wherein the second condition of the coil unit is a power-on condition for moving the armature to its released position, in opposition to the biasing exerted by the armature biasing arrangement, whereby the strut spring drives the strut to its deployed position.

17. The clutch assembly of claim 14, wherein the armature is configured to include a strut blocking feature arranged to engage and hold the strut in its non-deployed position when the armature is located in its engaged position and the coil unit is operating in its first condition, and wherein the helical path of the armature causes the strut blocking feature to disengage the strut when the armature is moved to its released position in response to the coil unit being shifted into its second condition.

18. The clutch assembly of claim 14, wherein the ballramp mechanism includes a cam groove associated with the first clutch member, a ramp groove associated with the second clutch member, and a ball disposed between the cam groove and the ramp groove, and wherein the cam grove and the ramp groove are configured and aligned such that axial movement of the armature relative to the coil unit causes corresponding rotary movement of the armature so as to define the helical path.

* * * * *